(12) United States Patent
Itai et al.

(10) Patent No.: US 9,242,589 B2
(45) Date of Patent: Jan. 26, 2016

(54) DUMP TRUCK BODY HOISTING STATE DISPLAY DEVICE

(71) Applicant: Hitachi Construction Machinery Co., Ltd., Bunkyo-ku, Tokyo (JP)

(72) Inventors: Yudai Itai, Tsuchiura (JP); Toshikazu Minoshima, Ushiku (JP); Takashi Yagyu, Ushiku (JP); Takanobu Ikari, Tsuchiura (JP); Takao Kurosawa, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/380,243

(22) PCT Filed: Feb. 7, 2013

(86) PCT No.: PCT/JP2013/052829
§ 371 (c)(1),
(2) Date: Aug. 21, 2014

(87) PCT Pub. No.: WO2013/125358
PCT Pub. Date: Aug. 29, 2013

(65) Prior Publication Data
US 2015/0025756 A1 Jan. 22, 2015

(30) Foreign Application Priority Data
Feb. 22, 2012 (JP) .................. 2012-036253

(51) Int. Cl.
*B60P 1/28* (2006.01)
(52) U.S. Cl.
CPC ...................... *B60P 1/283* (2013.01)
(58) Field of Classification Search
CPC .......................................... B60P 1/283
See application file for complete search history.

(56) References Cited

U.S. PATENT DOCUMENTS

2010/0026079 A1    2/2010   Nabeshima et al.
2011/0031802 A1*   2/2011   Dunigan ................. B60P 1/162
                                                    298/19 R

FOREIGN PATENT DOCUMENTS

DE    11 2008 000 131 T5    11/2009
JP         61-244492 A      10/1986
(Continued)

OTHER PUBLICATIONS

International Search Report (PCT/ISA/210) dated May 14, 2013, with English translation (Five (5) pages).
(Continued)

*Primary Examiner* — Mary Cheung
*Assistant Examiner* — Yuen Wong
(74) *Attorney, Agent, or Firm* — Crowell & Moring LLP

(57) ABSTRACT

A body hoisting state display device to be mounted on a dump truck includes: an angle detection unit that detects a rotation angle of the body with respect to the frame; a seating detection unit that detects whether or not the body is seated on the frame; a calculation unit that causes an inclination angle of the body at which the body is rotated with respect to the frame from a seated state of the body to be calculated, based on the rotation angle detected by the angle detection unit, as a ratio to an angle of a rotatable range that is defined between the seated state and a state in which the hydraulic cylinder is stopped at the position short of the position at which the hydraulic cylinder is extended to the maximal extent; and a display control unit that causes the ratio of the inclination angle of the body that is calculated by the calculation unit to be displayed on a display screen.

5 Claims, 19 Drawing Sheets

(56) References Cited

FOREIGN PATENT DOCUMENTS

| JP | 2-96223 U | 7/1990 |
| JP | 2001-105956 A | 4/2001 |
| JP | 2002-129600 A | 5/2002 |
| JP | 2002-294757 A | 10/2002 |
| JP | 2006-256443 A | 9/2006 |
| JP | 4432082 B2 | 3/2010 |

OTHER PUBLICATIONS

German Office Action dated Apr. 9, 2015 with partial English-language translation (twelve (12) pages).

\* cited by examiner (a)

(b)

(a)

(b)

DUMP TRUCK BODY HOISTING STATE DISPLAY DEVICE

TECHNICAL FIELD

The present invention relates to a display device that notifies a body hoisting state of a dump truck according to the present invention.

BACKGROUND ART

A dump truck includes a body for loading soil, stone or the like and a frame on which the body is mounted. Usually, a rear part of the body is pivotably supported at a rear end of the frame and a front part of the body is hoistably supported by the frame by means of a hoist cylinder. With this configuration, in the case of the dump truck, an up operation or down operation of an operating lever by the operator of the dump truck causes the hoist cylinder to extend or retract, which makes it possible to control hoisting of the body, with the rear part of the body serving as a fulcrum point. Conventionally, a dump truck is known, which schematically displays a motion picture of a hoisting state of the body during the body is under hoisting control (cf., for example, Patent Document 1)

CITATION LIST

Patent Literature

Patent Document 1: Japanese Patent No. 4432082.

SUMMARY OF INVENTION

Technical Problem

However, since it is difficult to recognize an actual inclination angle of the body by the motion picture, it is difficult for the operator to control operation speed of the hoist cylinder according to the hoisting state of the body with an accelerator pedal.

Solution to Problem

A body hoisting state display device to be mounted on a dump truck according to a first aspect of the present invention comprises: a body mounted on a frame; a hydraulic cylinder that moves up and down the body with respect to the frame between a seating position and a standing position; an operating member that operates up-and-down movement of the body; a hydraulic control unit that controls the up-and-down movement of the body by supplying or discharging pressure oil to or from the hydraulic cylinder, respectively, to extend or retract the hydraulic cylinder, respectively, according to an operation amount of the operating member; and a stop control unit that causes an extension and retraction operation of the hydraulic cylinder to be stopped at a position short of a position at which the hydraulic cylinder is extended to a maximal extent, wherein the dump truck body hoisting state display device further comprises: an angle detection unit that detects a rotation angle of the body with respect to the frame; a seating detection unit that detects whether or not the body is seated on the frame; a calculation unit that causes an inclination angle of the body at which the body is rotated with respect to the frame from a seated state of the body to be calculated, based on the rotation angle detected by the angle detection unit, as a ratio to an angle of a rotatable range that is defined between the seated state and a state in which the hydraulic cylinder is stopped at the position short of the position at which the hydraulic cylinder is extended to the maximal extent; and a display control unit that causes the ratio of the inclination angle of the body that is calculated by the calculation unit to be displayed on a display screen.

According to a second aspect of the present invention, in the dump truck body hoisting state display device according to the first aspect, it is preferable that when it is detected by the seating detection unit that the body is non-seated with respect to the frame, the display control unit causes the ratio of the inclination angle of the body and an icon, which indicates that the body is during the up-and-down movement, to be displayed on the display screen, and when it is detected by the seating detection unit that the body is seated with respect to the frame, the display control unit causes the display of the ratio of the inclination angle of the body and the icon to be interrupted.

According to a third aspect of the present invention, in the dump truck body hoisting state display device according to the first or second aspect, it is preferable to further comprise: a stop control unit that causes the hydraulic cylinder to stop an extension operation thereof at the position short of the position at which the hydraulic cylinder is extended to the maximal extent, wherein the display control unit causes the ratio of the inclination angle of the body calculated by the calculation unit to be displayed as 0 percent on the display screen when it is detected that the body is seated with respect to the frame, and when the body is stopped at the position short of the position at which the hydraulic cylinder is extended to the maximal extent, the display control unit causes the ratio of the inclination angle of the body calculated by the calculation unit to be displayed as 100 percent on the display screen, and when the body is at any angular position within the rotatable range, the display control unit causes the ratio of the inclination angle of the body to the angle at the position short of the position at which the hydraulic cylinder is extended to the maximal extent to be displayed on the display screen.

According to a fourth aspect of the present invention, in the dump truck body hoisting state display device according to any one of the first to third aspect, it is preferable that the display control unit causes the ratio of the inclination angle of the body to be displayed in a form of a bar graph on the display screen.

According to a fifth aspect of the present invention, in the dump truck body hoisting state display device according to any one of the first to fourth aspects, it is preferable that the display control unit causes the ratio of the inclination angle of the body to be displayed in a form of a numerical value on the display screen.

According to a sixth aspect of the present invention, in the dump truck body hoisting state display device according to any one of the first to fifth aspects, it is preferable to further comprise: a storage medium that stores a seating angle based on a first signal value output from the angle detection unit when the body is seated and a shockless stop angle based on a second signal value output from the angle detection unit when the hydraulic cylinder stops extension and refraction operation thereof at the position short of the position at which the hydraulic cylinder is extended to the maximal extent so that the body is stopped at a position short of the standing position, wherein: the calculation unit calculates a rotatable angle of the body based on a difference between the seating angle and the shockless stop angle, and a rotation angle of the body based on a difference between a third signal value output from the angle detection unit at any rotating position of the body and the first signal value, and divides the rotation angle of the body by the rotatable angle of the body, and the display control unit causes the inclination angle of the body to be displayed on the display unit in ratio based on a result of the division by the calculation unit.

According to a seventh aspect of the present invention, in the dump truck body hoisting state display device according to the sixth aspect, it is preferable that the display control unit causes the inclination angle of the body based on the result of division by the calculation unit and an icon, which indicates that the body is during the up-and-down movement, to be displayed on the display screen when it is determined by the seating detection unit that the body is not seated, and causes the display of the inclination angle of the body to be interrupted and the display of the icon to be turned off when it is determined that the body is seated.

Advantageous Effect of the Invention

According to the present invention, the inclination angle of the body can be recognized with ease by displaying the inclination angle of the body indirectly or directly or by displaying it in terms of angle ratio. Furthermore, a configuration is adopted such that the inclination angle of the body is displayed only when an icon, which indicates that the body is not seated, is displayed. Therefore, when it is judged that the body is seated and the icon is not displayed, it does not happen that the inclination angle of the body is displayed, so that the operator will not feel strangeness or discomfort.

DESCRIPTION OF EMBODIMENTS

Figure 1:
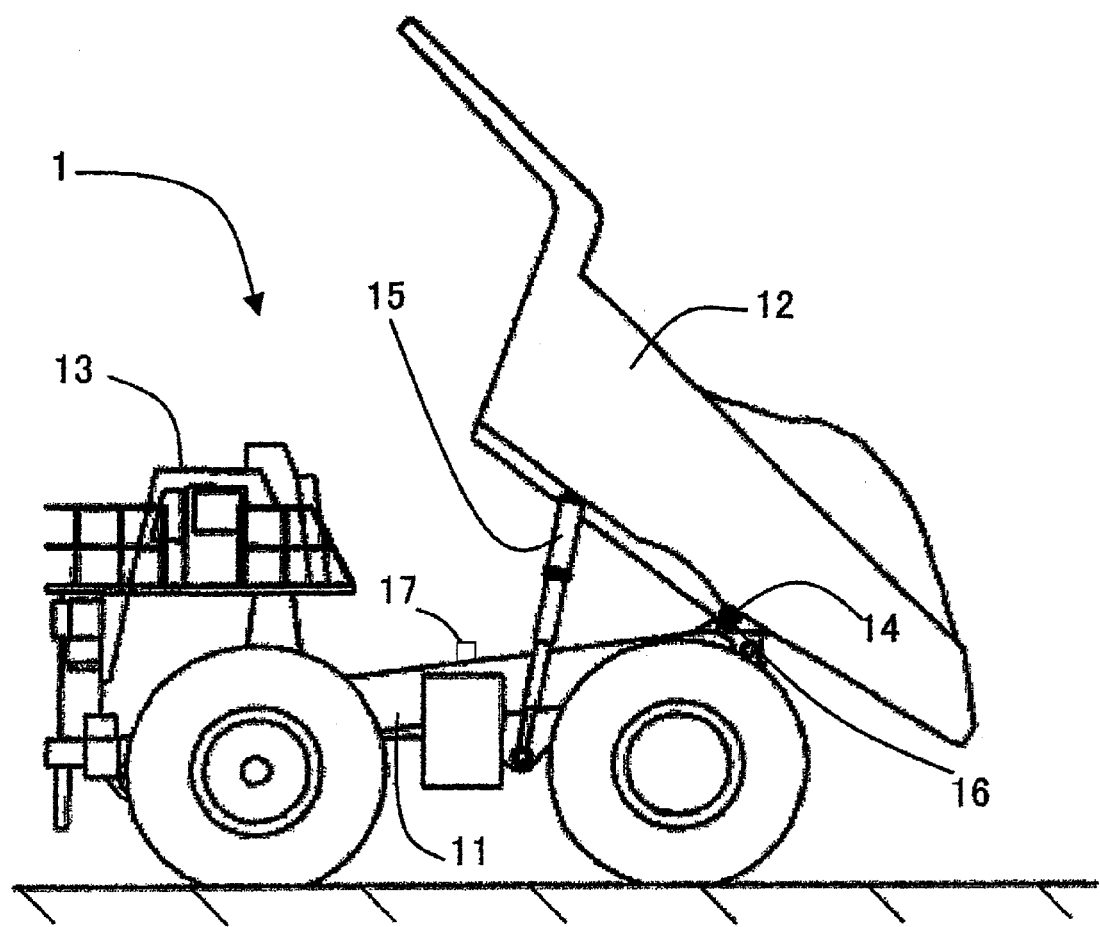
FIG. 1 presents an outline side view showing a dump truck in whole according to an embodiment of the present invention.

Hereafter, referring to the drawings, explanation is made of a body hoisting state display device of a dump truck according to an embodiment of the present invention.

FIG. 1 presents an outline side view showing a dump truck 1 in whole according to an embodiment of the present invention. As shown in FIG. 1, a dump truck 1 is constituted by a frame 11, a body 12, a cab 13, a support shaft 14, and hoist cylinders 15. The body 12 is coupled to a rear end of the frame 11 with the support shaft 14 and configured to be rotatable or tiltable with the support shaft 14 serving as a fulcrum point. A pair of hoist cylinders 15 is provided to the frame 11 on the right and left sides thereof. The respective cylinders 15 are disposed between a portion of the body 12, which portion is slightly forward with respect to a central portion of the body 12 in the longitudinal direction, and the frame 11 and are extended and retracted by supply and discharge of pressure oil thereto and therefrom, respectively. The body 12 tilts around the support shaft 14, with the support shaft 14 serving as a fulcrum point, according to the extension and retraction of the hoist cylinders 15, i.e., the body 12 moves up and down, respectively.

In the vicinity of the support shaft 14 is provided a body angle sensor 16. The body angle sensor 16 is a sensor that detects the hoisting state of the body 12, that is, a rotation angle of the body 12 with respect to the frame 11 and outputs a voltage signal indicating the detected angle to a hydraulic controller unit (HCU). The frame 11 is provided with a seating switch 17 at a position at which the frame 11 and the body 12 contact each other. The seating switch 17 is a sensor that detects a seating state of the body 12 and outputs an ON signal to the hydraulic controller unit (HCU) when the body 12 is seated on the frame 11.

Figure 2:
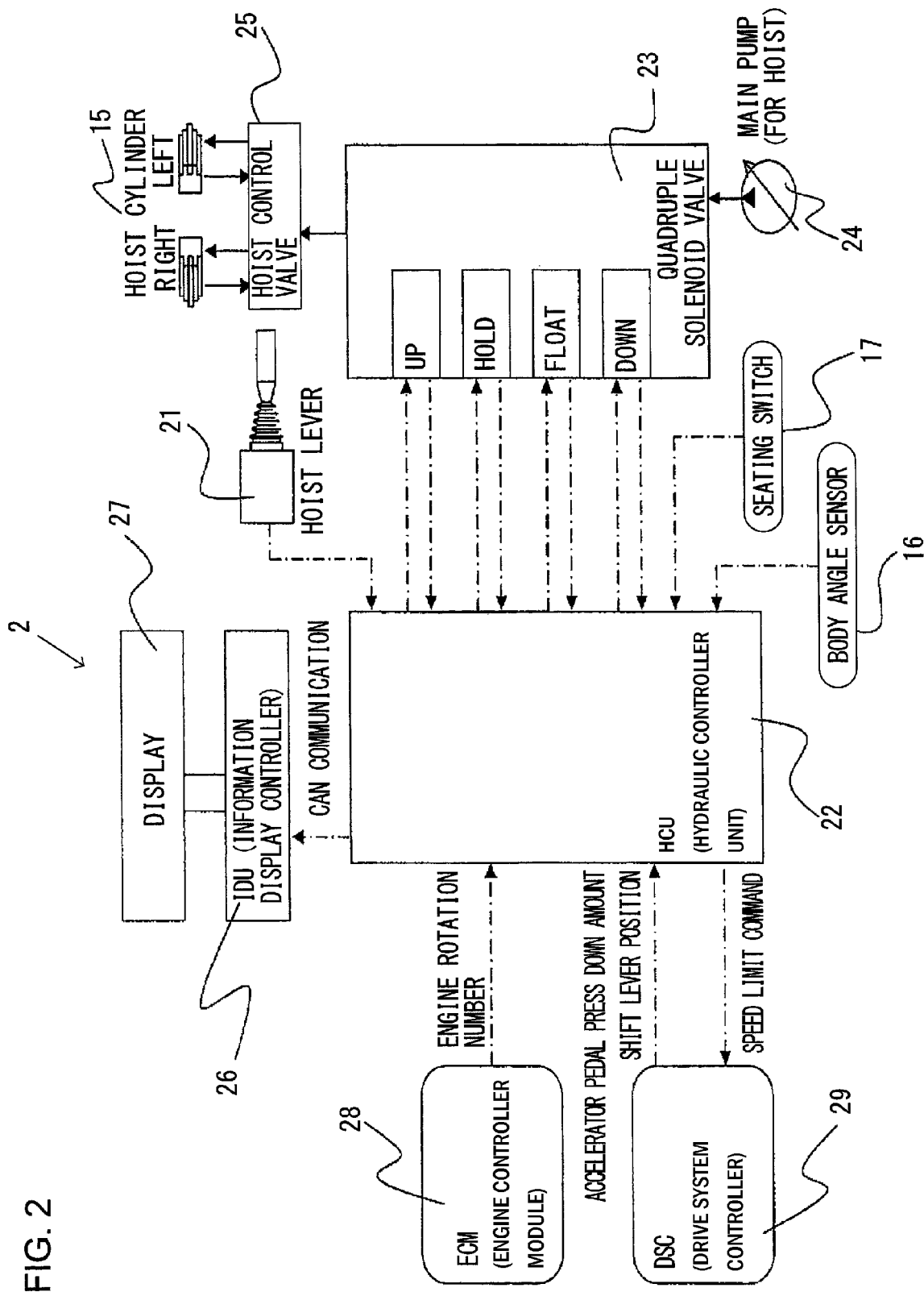
FIG. 2 presents a block diagram showing a configuration of major portions of a body hoisting state display device according to an embodiment.

FIG. 2 presents a block diagram showing a control system in whole including a body hoisting state display device 2, which is mounted on the dump truck 1. The body hoisting state display device 2 includes a hydraulic controller unit (HCU) 22, an information display controller (IDU) 26, and a display 27. Note that an engine controller module (ECM) 28 controls an engine and a drive system controller (DSC) 28 controls a traveling motor.

A hoist lever 21 is provided in the cabin 13, which is an operation member to be operated by the operator so as to move up and down of the body 12. When the operator operates the hoist lever 21, the hoist lever 21 outputs a lever angle signal indicating information about a lever angle according to an operation amount to the HCU 22.

The HCU 22 is a control device for electronically controlling various operations of the dump truck 1. The HCU 22 judges, based on the lever angle signal that is input from the hoist lever 21, which one of operation modes of the hoist cylinder 15 (UP, HOLD, FLOAT, or DOWN) is selected by the operation of the lever 21. The HCU 22 outputs a command to respective solenoids of a quadruple solenoid valve 23 according to the judged operation mode to extend/retract the hoist cylinders 15.

In case of the dump truck according to the present invention, with a view to protecting the hoist cylinders 15, the rotation or tilting of the body 12 is temporarily stopped at a position short of a position at which the hoist cylinders 15 are extended to a maximal extent (hereafter, referred to as "body-up-shockless position"). That is, the body-up-shockless position is provided to decrease a shock caused when the hoist cylinders 15 are extended to a maximal extent. Such a stop control is called body-up-shockless control. In the body hoisting state display device 2, as described in detail below, the rotation state of the body 12 is displayed on a meter, taking into consideration of body-up-shockless control.

The HCU 22 transmits the detected angle signal that is input from the body angle sensor 16, information about presence or absence of an ON signal from the seating switch 17, information about the number of rotations of the engine as described later, information about an amount of pressing down an accelerator pedal and about a shift lever to the information display controller (IDU) 26 by way of CAN (Controller Area Network) communication. The IDU 26 displays various pieces of information on the display 27 based on various pieces of information transmitted from the HCU 22. Note that the controls of information display on the display 27 by the HCU 22 and the IDU 26 are described in detail later.

The quadruple solenoid valve 23 changes over a hoist control valve 25 in response to the command from the HCU 22 to supply pressure oil from a main pump 24 to the hoist cylinders 15 or discharge pressure oil from the hoist cylinders 15. The main pump 24 is a pump that is operated by using power from the engine (not shown) and the discharge flow rate of it increases according to the rotation speed of the engine, that is, the rotation number of the engine. The engine controller module (ECM) 28 takes information indicating the rotation number of the engine from the engine and transmits it to the HCU 22 via the CAN communication. The drive system controller (DSC) 29 transmits information about the press down amount of the accelerator pedal and an operational position of the shift lever to the HCU 22 via the CAN communication. Also, the DSC 29 receives a speed restriction command value from the HCU 22 when the body 12 is not seated.

Figure 3:
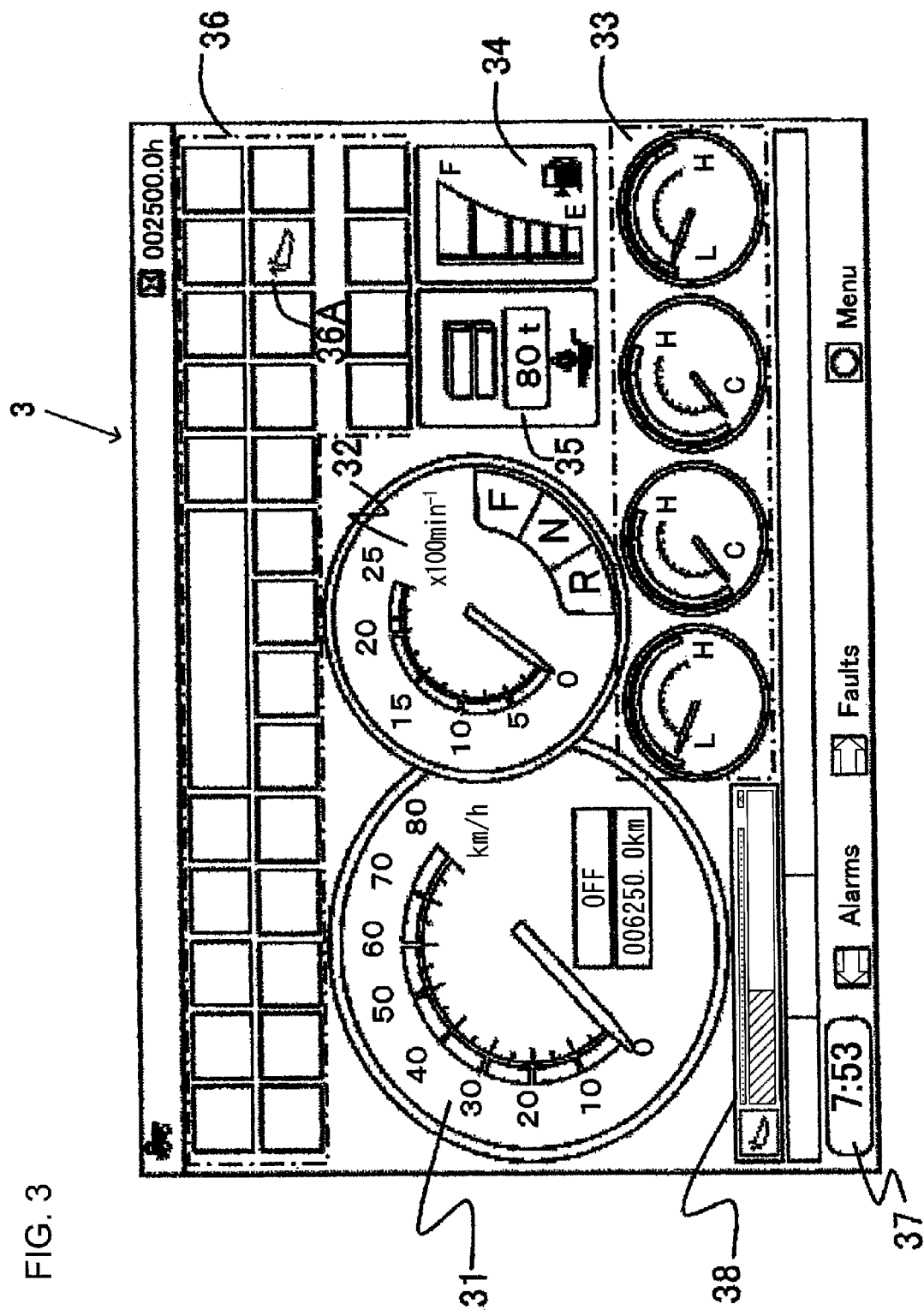
FIG. 3 presents a diagram explaining an example of a meter screen.

Then, how to control the display of information on the display 27 by the HCU 22 and the IDU 26 is explained below. FIG. 3 schematically shows a meter screen 3 that is displayed on the display 27. The meter screen 3 is constituted by a speed meter 31, a tachometer 32, various meters 33, a fuel level meter 34, a loading capacity display unit 35, various lamps 36, a clock 37, and a body angle meter 38. On the speed meter 31 is displayed speed information of the frame 11. On the tachometer 32 is displayed the rotation number of the engine. The body angle meter 38 directly displays information about the hoisting state, that is, the inclination or tilt angle, of the body 12 in terms of a numerical value and also displays that information indirectly in the form of a bar graph.

On the various meters 33 are displayed various pieces of information about pressure, temperature, etc. On the loading capacity display 35 is displayed the loading capacity of the body 1. The various lamps 36 indicate various states of the dump truck 1. A body-up icon 36A included in the various lamps 36 is lighted when the seating switch 17 outputs no ON signal, that is, when the body 12 is not seated.

Figure 4:
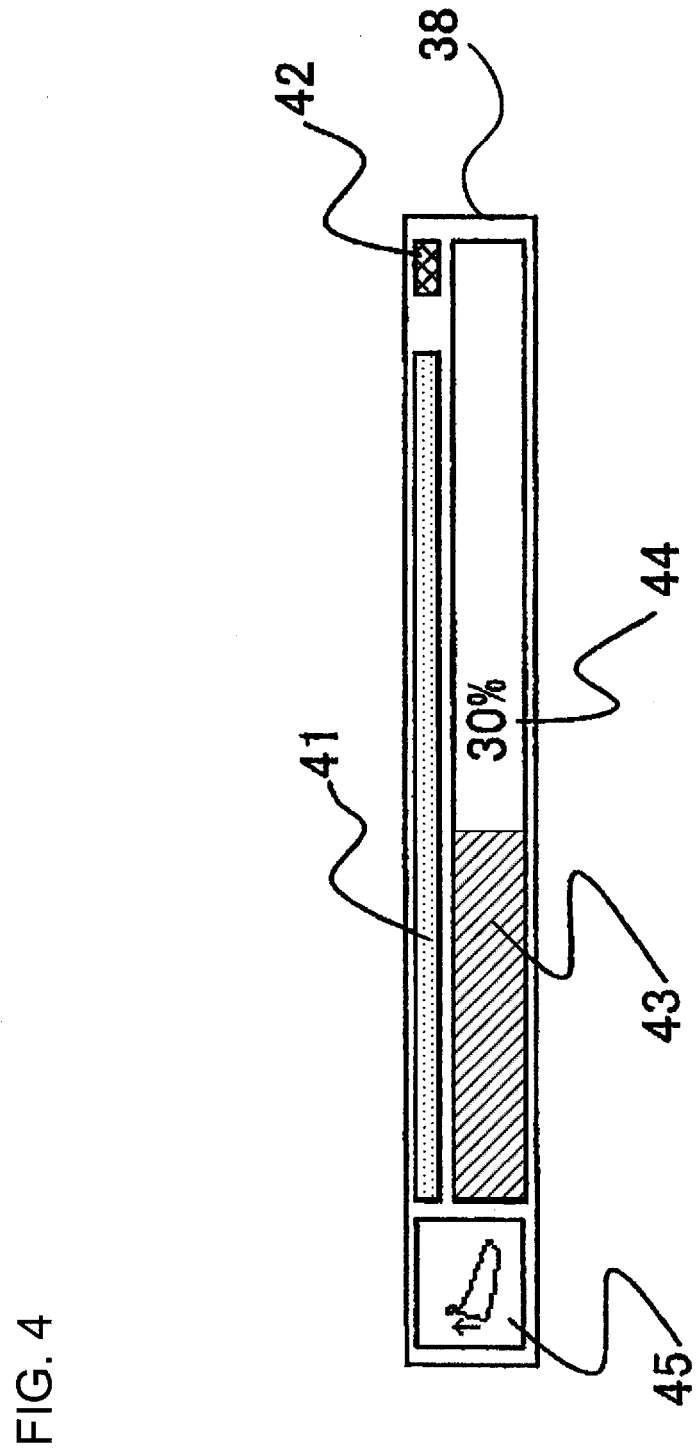
FIG. 4 presents a diagram explaining an example of a body angle meter.

FIG. 4 presents a diagram that schematically shows details of the body angle meter 38. The body angle meter 38 includes a recommended operating range 41 and a non-recommended operating range 42 of the body 12, a gauge 43 that indicates the present inclination angle of the body 12 in percentage and a numerical value 44, and an abnormality display icon 45 that indicates an abnormal or normal state of the body angle sensor 16.

In the recommended operating range 41 of the body angle meter 38, an inclination angle at which the body 12 is seated is taken as 0 percent and an inclination angle at which body-up-shockless control is activated is taken as 100 percent and the present inclination angle of the body 12 is displayed in ratio by using the gauge 43 and the numerical values 44. The gauge 43 is displayed with an indication width thereof being increased from the left end toward the right end in FIG. 4 according as the inclination angle of the body 12 increases. In other words, the recommended operating range 41 is a range of the inclination angle expressed in percentage when the body 12 is tilted between the seating position and the body-up-shockless position. Note that for the convenience of illustration, the indication range of the gauge 43 is shaded.

The non-recommended operating range 42 is a display portion that displays that the body 12 is tilted up beyond the body-up-shockless position. Like the recommended operating range 41, the present inclination angle of the body 12 is displayed in percentage by using the gauge 43 and the numerical values 44.

In the present embodiment, supposing possible attachment error of the body angle sensor 16, possible attachment error of the hoist cylinders 15 and the like, the percentage of the inclination angle of the body 12 is calculated according to a sensor output voltage output from the body angle sensor 16 as follows.

Figure 5:
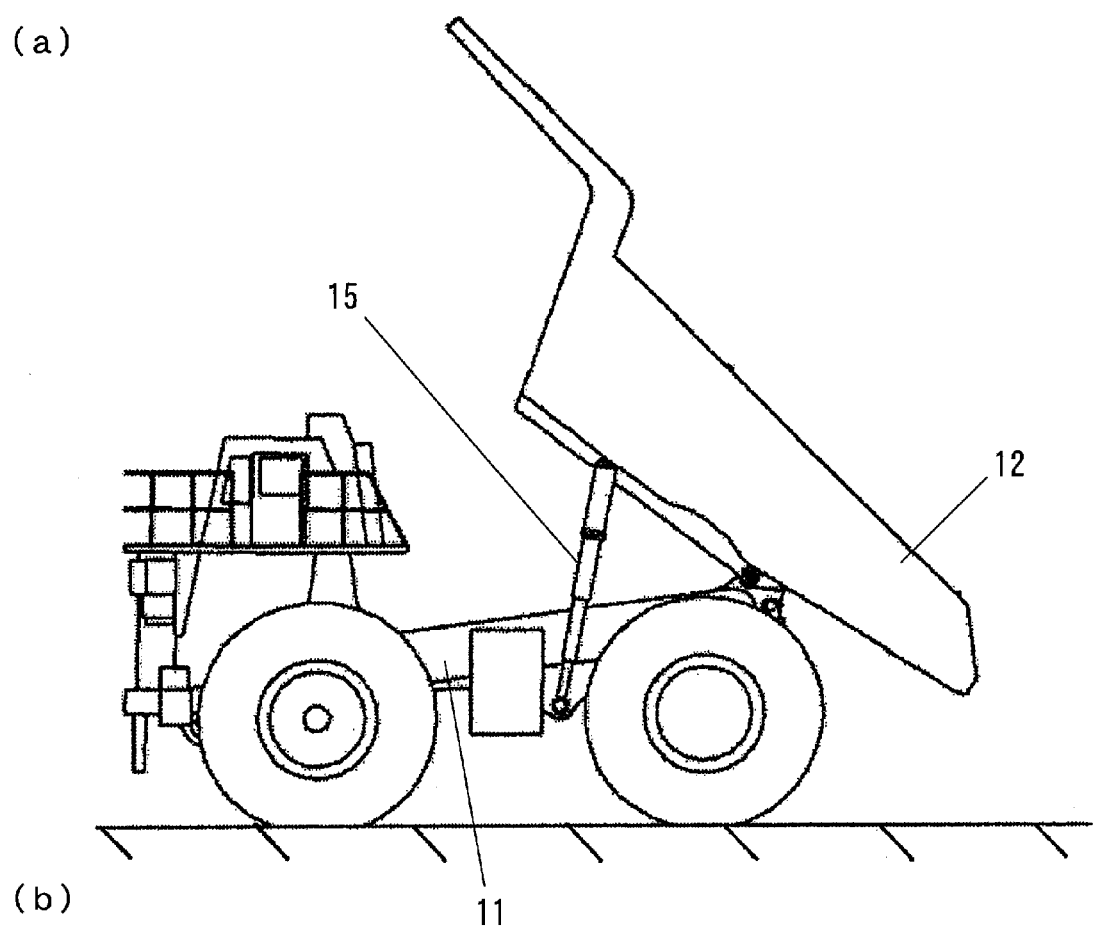
FIGS. 5a and 5b present diagrams explaining standing and seating of the body.
Figure 5:
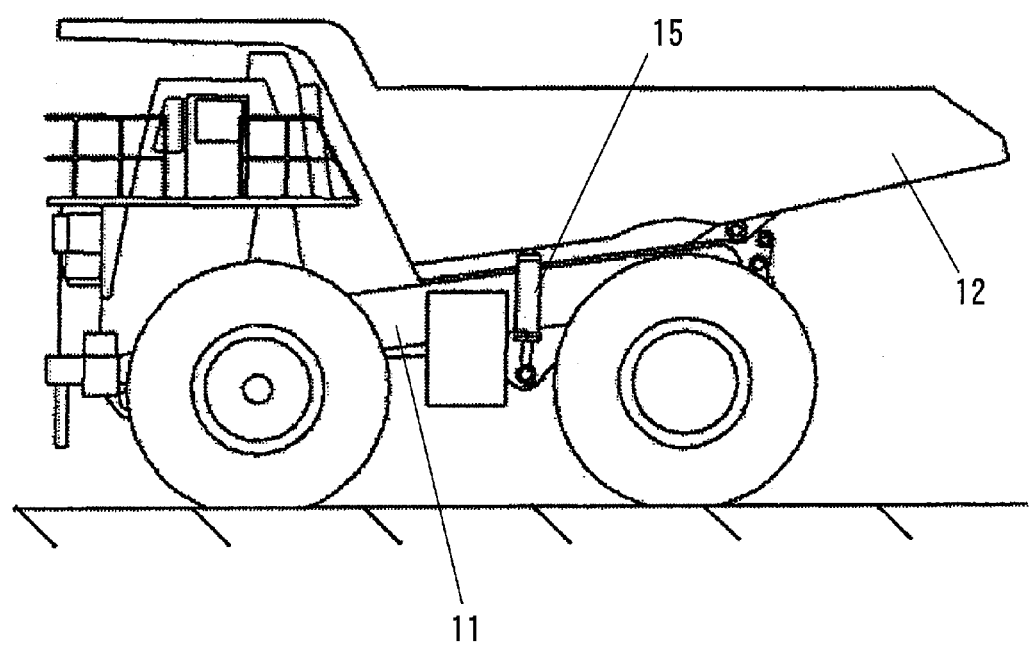
Figure 6:
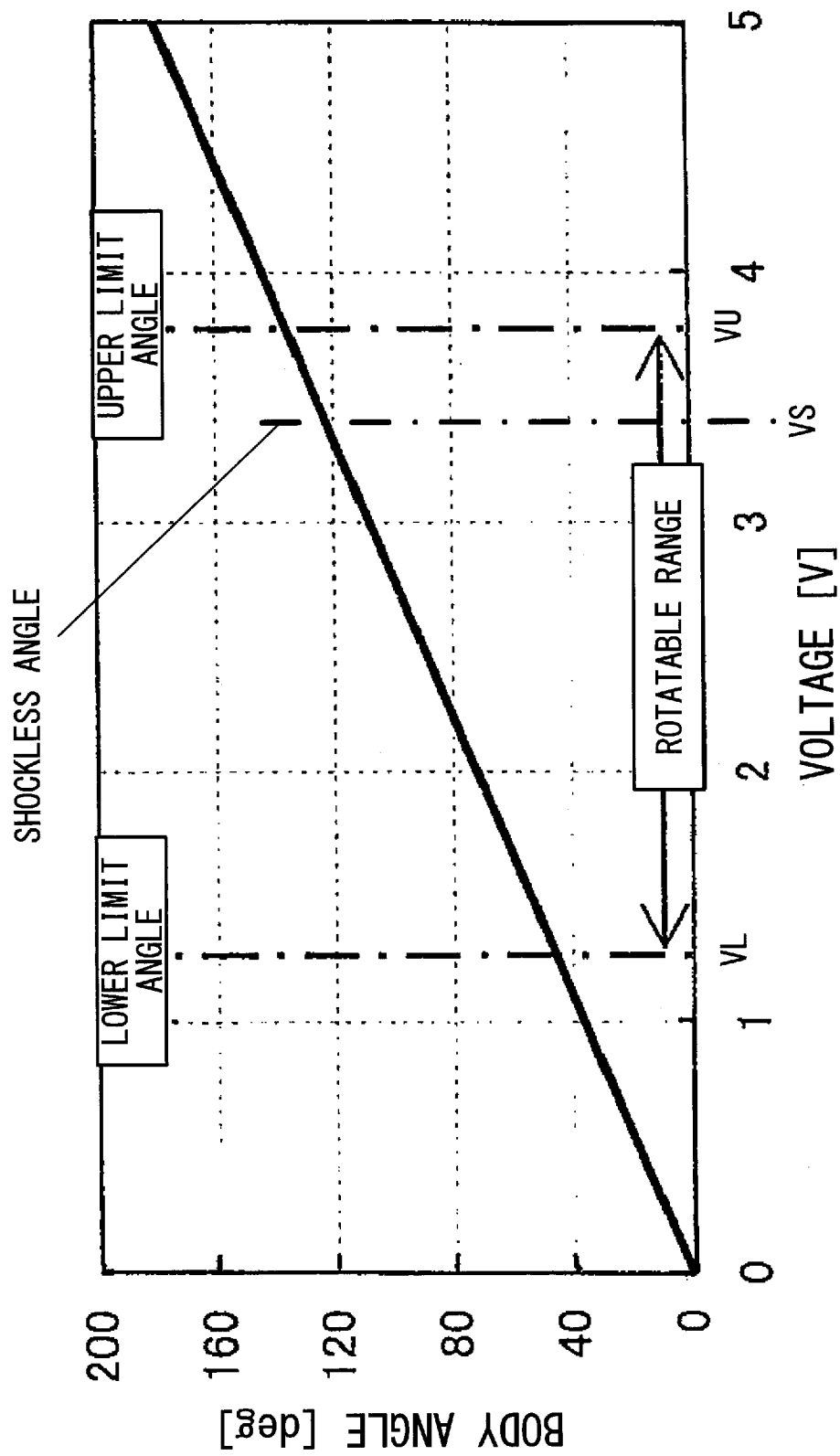
FIG. 6 presents a diagram explaining conversion of a rotation angle of a body angle sensor.

Explanation is made referring to FIG. 5 and FIG. 6.

The body 12 can keep any posture between a seating posture in which the body 12 is seated in the frame 11 and a standing posture in which the hoist cylinders 15 are stopped at an extension end, that is, within a rotatable range. The upper limit angle of the body 12 is an inclination angle in case that the hoist cylinders 15 are stopped at an extension end thereof as shown in FIG. 5(a). On the other hand, the lower limit angle of the body 12 is an inclination angle at which the hoist cylinders 15 are stopped at a retraction end, that is, an inclination angle at which the body 12 is seated.

The upper limit angle and the lower limit angle of the body 12 are calculated as initial setting before delivery of the device to a customer by performing the following steps and set in a predetermined memory area in advance.

When the hoist cylinders 15 are being retracted and then, the body 12 is seated, a sensor output voltage output from the body angle sensor 16 is stored as a lower limit value VL. On the other hand, when the hoist cylinder 15 is extended and stopped at the extension end, that is, when the body 12 is in a standing posture, the sensor output voltage output from the body angle sensor 16 is stored as an upper limit value VU. Furthermore, a sensor voltage output from the body angle sensor 16 when the hoist cylinders 15 are stopped at the body-up-shockless position is stored as a shockless stop voltage value VS.

Note that as shown in FIG. 6, the lower limit value VL stored in this way can be called a lower limit angle and the upper limit value VU can be called an upper limit angle, and the stop voltage VS can be called a shockless stop angle.

The body 12 can be stopped at any angle between the seated posture and the standing posture (within body rotatable range) by operation of the hoist lever as described above. Assuming that the sensor output voltage, which is output from the body angle sensor 16 when the body 12 is stopped at any position, is VP, the percentage of the inclination angle of the body 12 to the rotatable range, Bangle, is calculated according to equation (1) below.

$$Bangle(\%)=\{(VP-VL)/(VU-VL)\}\times 100 \quad (1)$$

Figure 11:
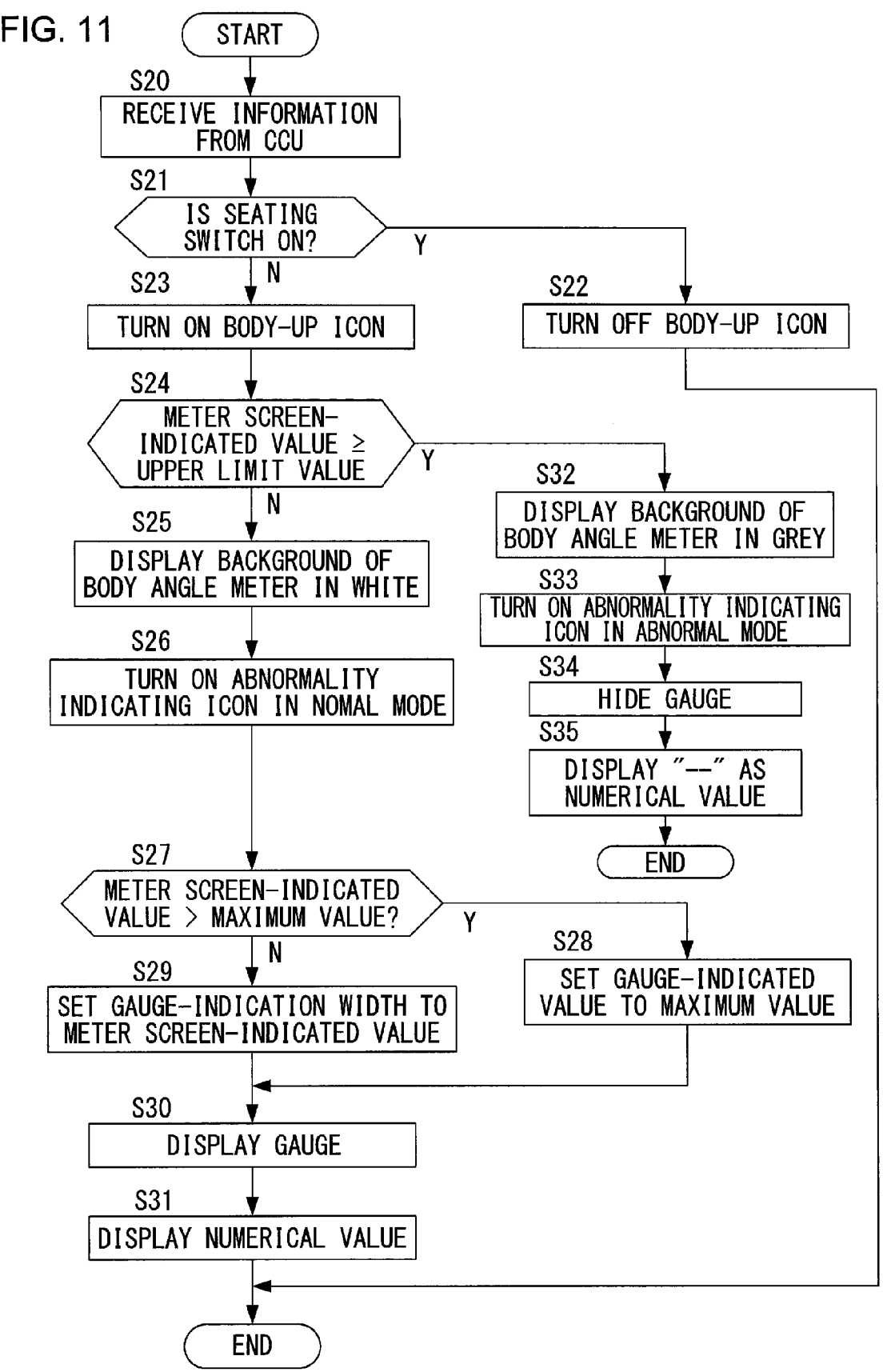
FIG. 11 presents a flowchart explaining processing executed by an IDU.

Note that referring to FIG. 11, (VU−VL) is a voltage value representing a rotatable range, (VP−VL) is a voltage value representing the rotation angle of the body 12 assuming that when the body 12 is seated, the rotation angle is 0 degrees. Therefore, equation (1) can be expressed as converted into equation (2).

$$\text{Ratio of body inclination angle, } Bangle(\%)=(\text{any rotation angle/rotatable range})\times 100 \quad (2)$$

As mentioned above, according to the present embodiment, the inclination angle of the body 12 expressed in percentages when the hoist cylinders 15 are temporarily stopped at the body-up-shockless position is taken as 100%. Accordingly, the HCU 22 causes Bangle (%) to be converted according to equation (3) below to calculate BHangle (%) such that when the hoist cylinders 15 are temporarily stopped at the body-up-shockless position, the body inclination angle displayed on the meter screen becomes 100% inclination angle, and the HCU 22 causes the calculated value to be transmitted to the IDU 26.

$$BHangle(\%)=\{(VP-VL)/(VS-VL)\} \times 100 \tag{3}$$

As mentioned above, the shockless stop voltage value VS is an output voltage that is output from the body angle sensor 16 when the hoist cylinders 15 are temporarily stopped at the body-up-shockless position.

Note that in the description, BHangle (%) converted from Bangle (%) is called a meter screen-indicated value. And assuming that (VS−VL) is called a shockless stop rotatable range, the meter screen-indicated value can also be expressed by equation (4) below.

$$\text{Meter screen-indicate value } BHangle(\%)=(\text{Any rotation angle/shockless stop rotatable range}) \times 100 \tag{4}$$

Figure 7:
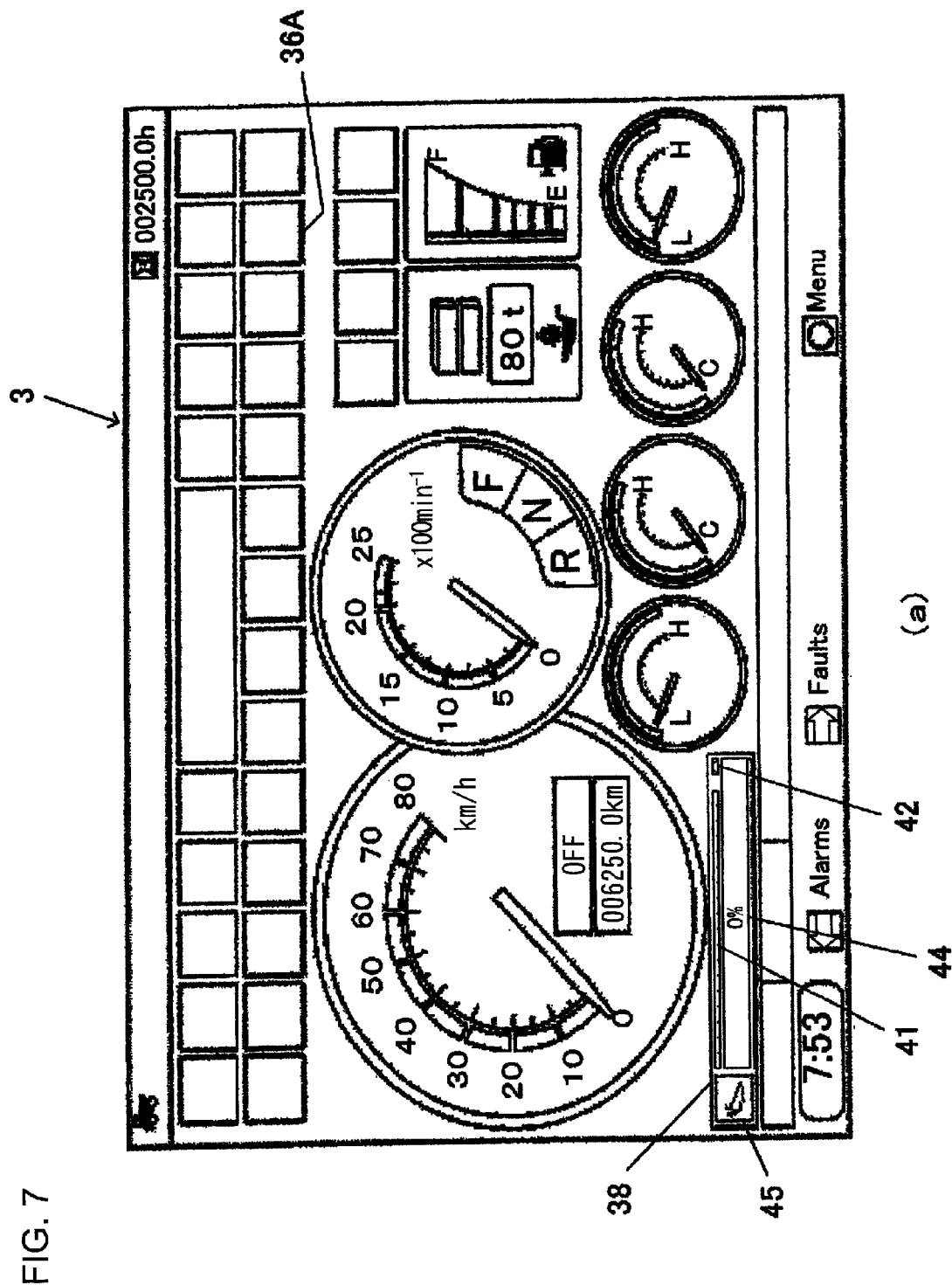
FIGS. 7a and 7b present diagrams explaining transition of a meter screen.
Figure 7:
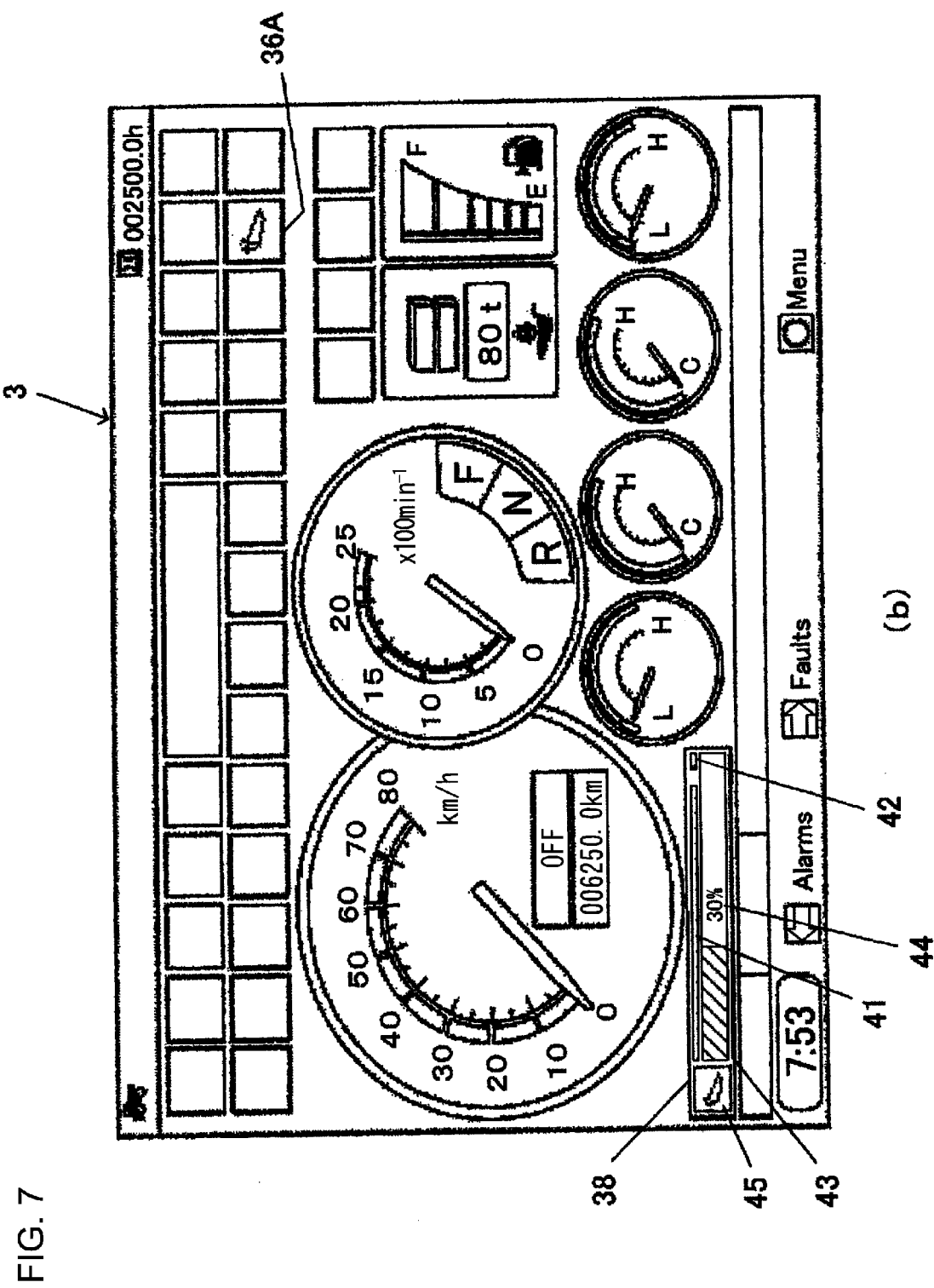
Figure 8:
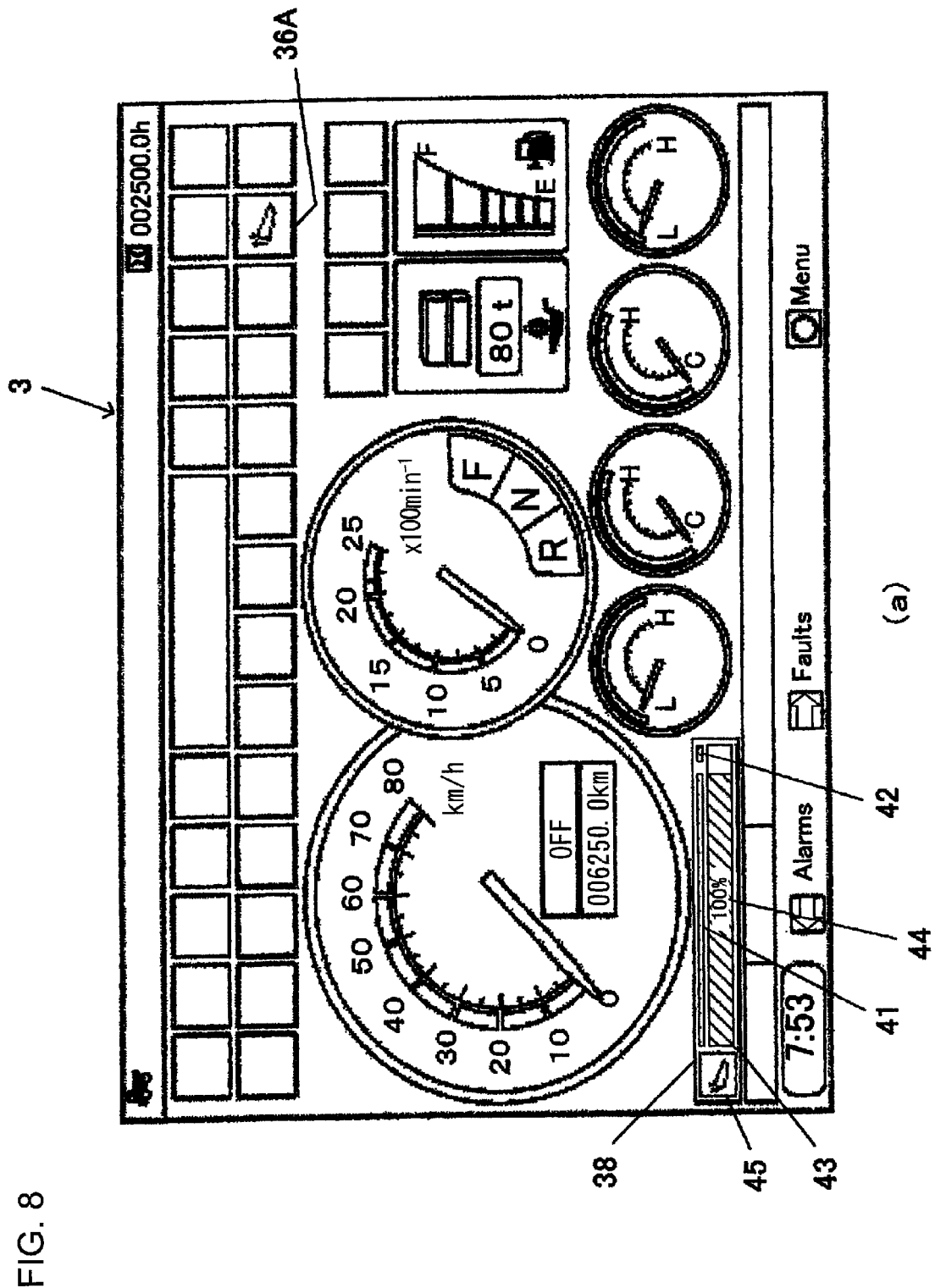
FIGS. 8a and 8b present diagrams explaining transition of a meter screen.
Figure 8:
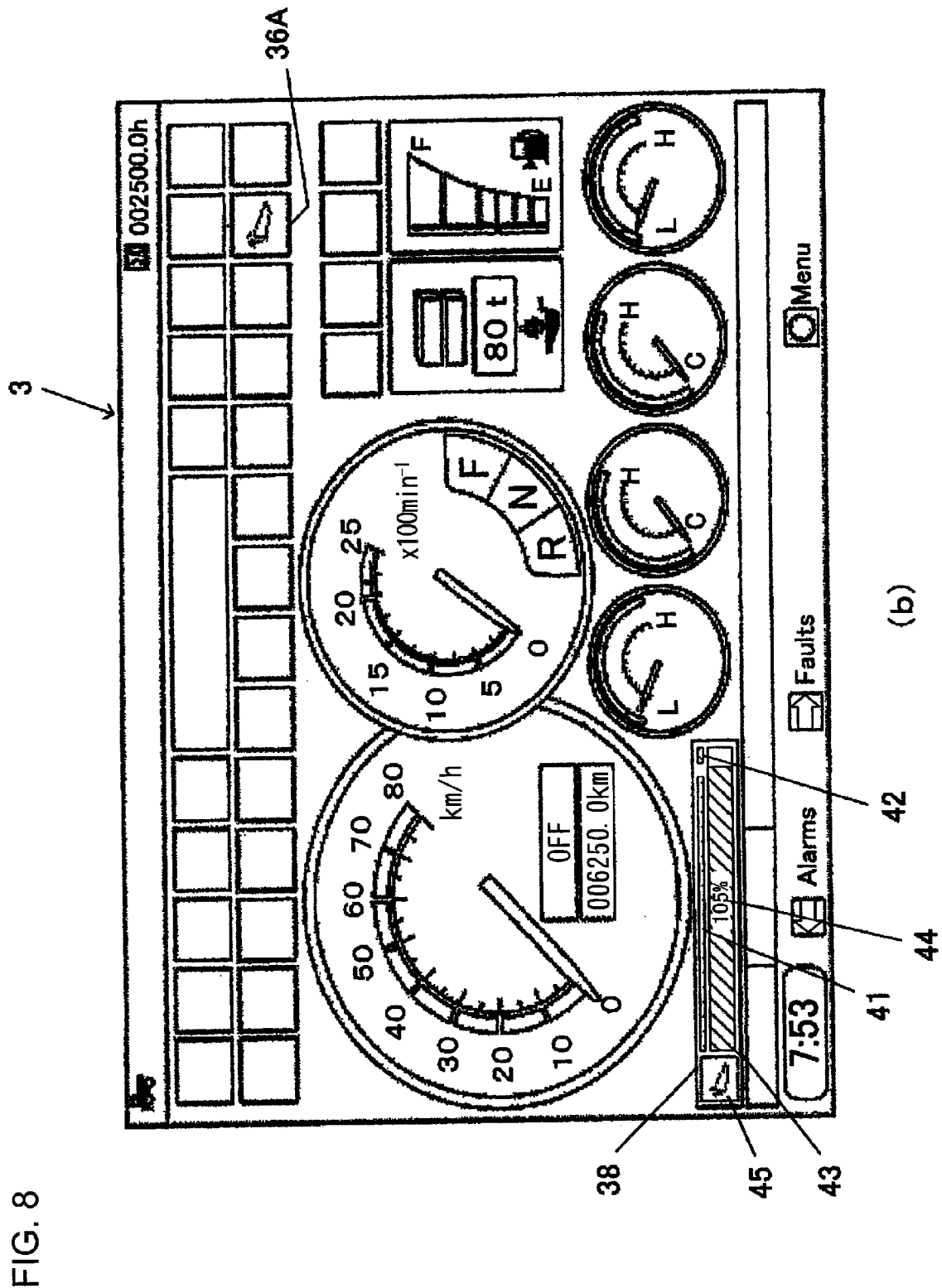
Figure 9:
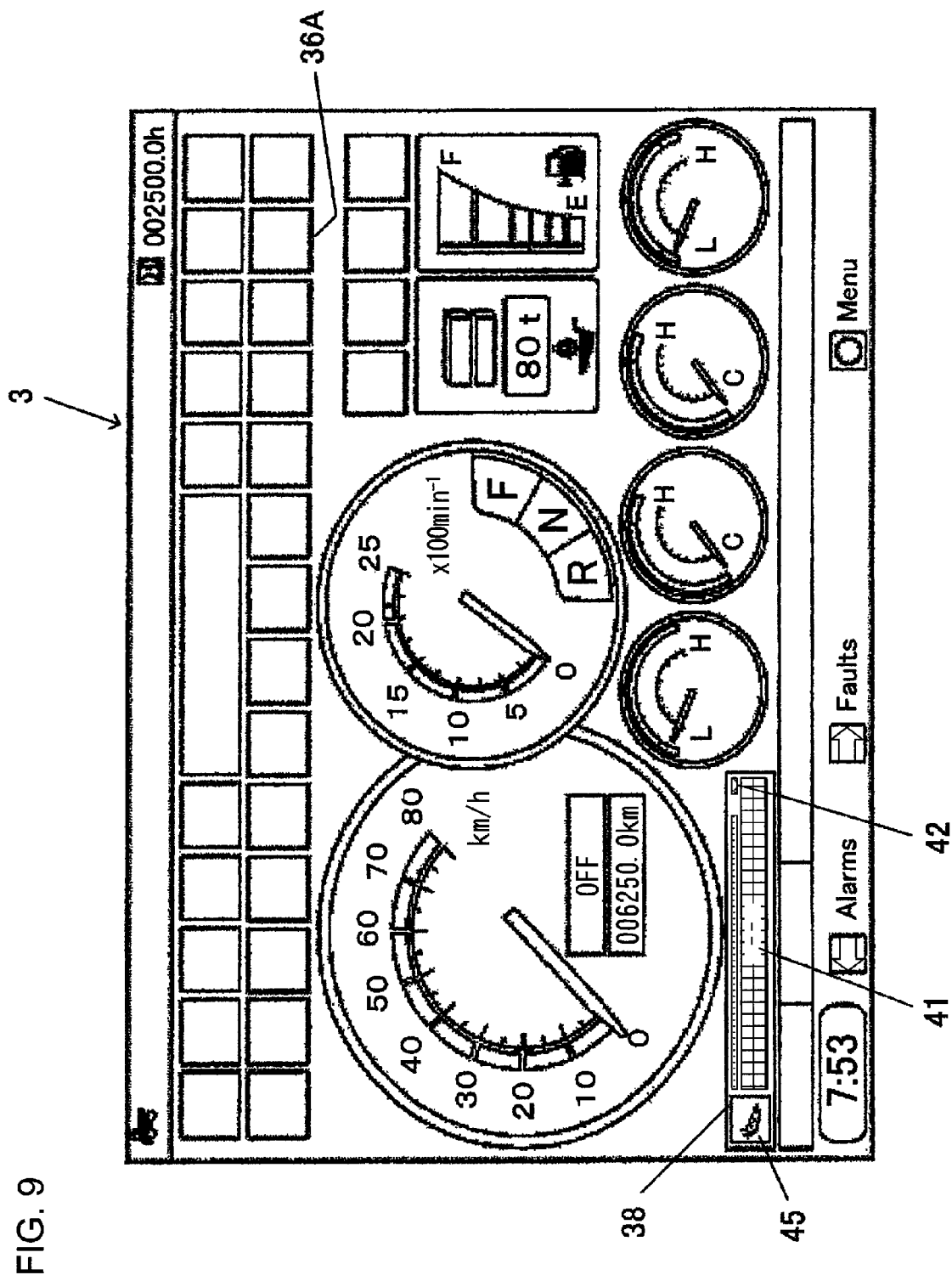
FIG. 9 presents a diagram explaining transition of a meter screen.

Referring to FIGS. 7 to 9, explanation is made as to how the display state of information relating to inclination angle of the body 12 displayed by the body angle meter 38 change. Note that in FIGS. 7 to 9, for the convenience of explanation, illustration is made assuming that the rotation number of the engine is 0. However, in actuality, display is changed according to the rotation number of the engine.

When the body 12 is seated—

FIG. 7(*a*) shows the meter screen 3 when the body 12 is in a seated state. The HCU 22 judges that in case of (1) or (2) below, the body 12 is in a state of being seated in the frame 11.
(1) When an ON signal is received from the seating switch 17, or
(2) When the detection angle detected by the body angle sensor 16 is below the lower limit angle to be detailed later.

In the case of (1) or (2) above, the HCU 22 causes the inclination angle of the body 12 to be set to "0 percent" and causes the inclination angle to be transmitted to the IDU 26 via the CAN communication. When the IDU 26 receives the inclination angle of the body 12 via the CAN communication, the IDU controls the body angle meter 38 so as not to display gauge 43 and display "0 percent" as the numerical value 44.

When the body 12 is rotated—

FIG. 7(*b*) shows an example of the display on the meter screen 3 when the body 12 stands at a predetermined inclination angle. FIG. 7(*b*) shows a case in which assuming that when a position to which the body 12 is tilted up to the body-up-shockless position is taken as 100%, the body 12 is tilted up to and stopped at a position corresponding to 30%.

The HCU 22 causes a meter screen-indicated value BHangle (%), which is a converted inclination angle, to be transmitted to the IDU 26 via the CAN communication. The IDU 26, when it receives the meter screen-indicated value via the CAN communication, causes the display length of the gauge 43 to be increased or decreased, and causes the numerical value 44 to be increased or decreased, according to the received meter screen-indicated value. Furthermore, when no ON signal is received from the seating switch 17 though the HCU 22, the IDU 26 causes the body-up icon 36A to be displayed as lighted.

FIG. 8(*a*) shows the display of the meter screen 3 when the inclination angle of the body 12 reaches the body-up-shockless position. In other words, FIG. 8(*a*) shows a case in which the meter screen-indicated value BHangle (%) converted by the HCU 22 is 100 percent. In this case, the IDU 26, when it receives the meter screen-indicated value, causes the gauge 43 to be displayed so as to be extended to the right end of the recommended operating range 41 and to display "100 percent" as the numerical value 44.

FIG. 8(*b*) shows the display of the meter screen 3 when the body 12 is driven beyond the body-up-shockless position. In other words, FIG. 8(*b*) shows a case in which the meter screen-indicated value BHangle (%) converted by the HCU 22 exceeds 100 percent. The HCU 22 judges whether or not the converted meter screen-indicated value is an upper limit value that can be indicated by the numerical value 44, that is, whether or not the converted meter screen-indicated value overflows. When the meter screen-indicated value does not exceed (i.e., does not overflow) the upper value of the numerical value 44, the HCU 22 causes the converted meter screen-indicated value to be transmitted to the IDU 26 via the CAN communication. When the meter screen-indicated value exceeds (i.e., overflows) the upper limit value of the numerical value 44, the HCU 22 causes the meter screen-indicated value to be set to a maximum value of a variable type, that is, an upper limit value of the numerical value 44, and causes it to be transmitted to the IDU 26 via the CAN communication.

The IDU 26, upon receipt of the meter screen-indicated value via the CAN communication, causes the gauge 43 to be displayed beyond the right side end of the recommended operating range 41 to reach the non-recommended operating range 42 according to the value transmitted from the HCU 22. Furthermore, the IDU 26 causes the numerical value 44 to be changed according to the value transmitted from the HCU 22 and causes the changed value to be displayed. In this case, the inclination angle of the body 12 is beyond the body-up-shockless position, that is, the rotatable range, so that the numerical value 44 is displayed as a value exceeding 100 percent.

When the body angle sensor 16 is abnormal—

FIG. 9 shows the display of the meter screen 3 when the body angle sensor 16 is judged to be abnormal as a sensor. When the IDU 26 receives a signal indicating that the body angle sensor 16 is abnormal from the HCU 22, the IDU 26 causes an abnormality indication icon 45 to be lighted in an abnormal mode. Furthermore, the IDU 26 causes the gauge 43 to be displayed over the whole displayable range. On this occasion, the IDU 26 causes the gauge 43 to be displayed in a color different from the color used when the body angle sensor 16 is normal, for example, in grey. Note that for convenience of illustration, the gauge 43 is patterned with lattice. Furthermore, the IDU 26 may cause the numerical value 44 to be expressed in bar, for example, "--" in order to indicate that the body angle sensor 16 is abnormal. Note that whether the body angle sensor 16 is normal or abnormal is judged based on a sensor voltage signal output from the body angle sensor 16. Explanation on details of abnormality judgment is omitted.

When the hoist cylinders 15 are stopped at the body-up-shockless position, an operation, in which the hoist lever 21 is temporarily returned to a neutral position and again the body 12 is rendered up, allows the hoist cylinders 15 to be extended beyond the body-up-shockless position.

Figure 10:
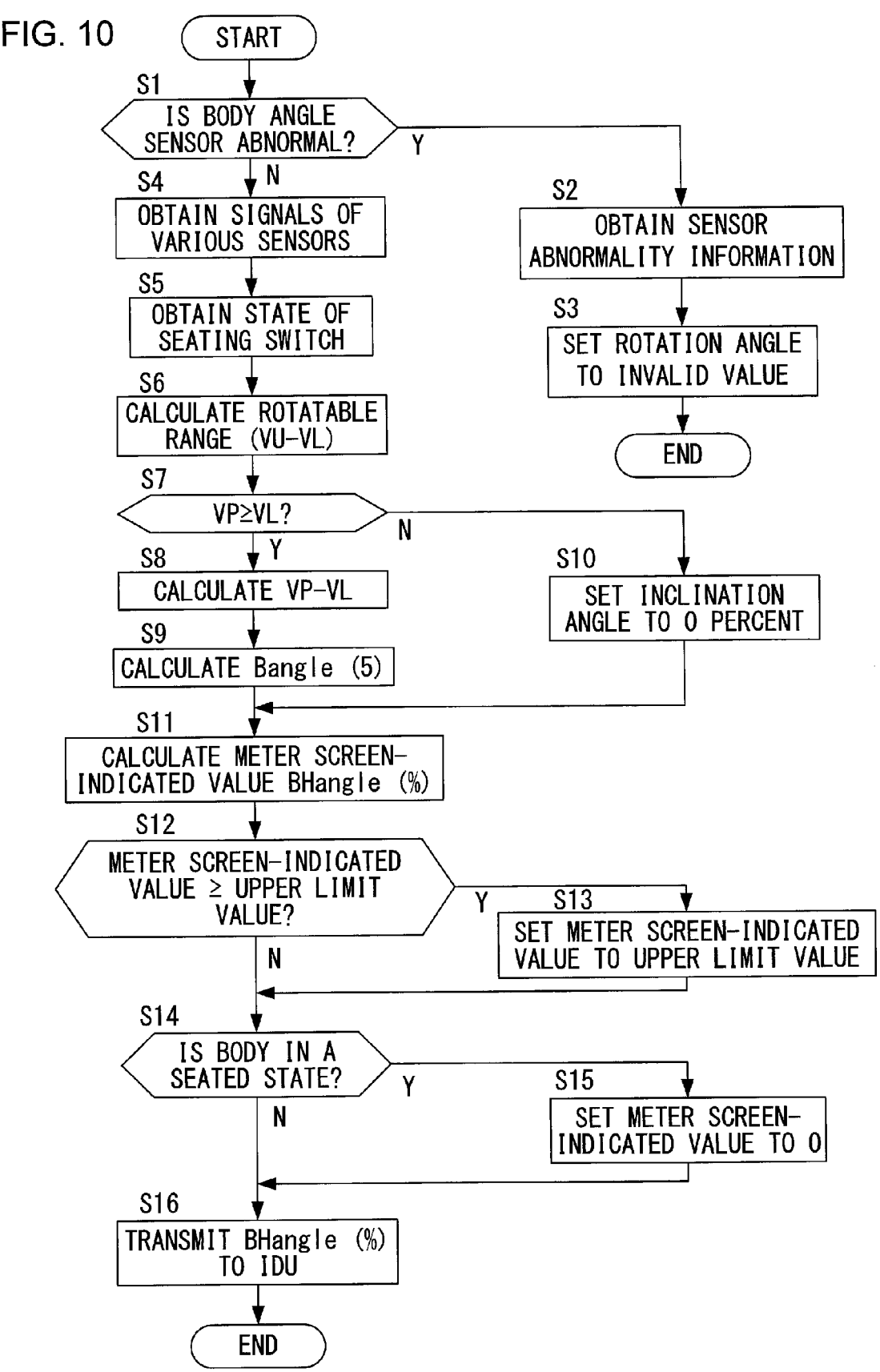
FIG. 10 presents a flowchart explaining processing executed by a HCU.

Referring to the flowcharts shown in FIGS. 10 and 11, explanation is made on the operation of the body hoisting state display device 2 according to the present embodiment. Each processing shown in FIG. 10 is performed by executing a program in the HCU 22. Each processing shown in FIG. 11 is performed by executing a program in the IDU 26. The programs for performing each processing in FIGS. 10 and 11 are stored in a memory (not shown). When the hoist lever 21 is operated by the operator to output a lever angle signal, the program is started up and executed by the HCU 22. First, referring to FIG. 10, the processing executed by the HCU 22 is explained.

In step S1, presence or absence of abnormality of the body angle sensor 16 is judged. When the body angle sensor 16 is judged to be abnormal, a positive judgment is made in step S1 and the program proceeds to step S2. In step S2, information indicating that the body angle sensor 16 is in an abnormal state is stored and in step S3, a sensor voltage signal output from the body angle sensor 16, in other words, a rotation angle corresponding to the sensor voltage signal, is set to an invalid value and the processing is terminated.

When the body angle sensor 16 is judged to be normal, a negative judgment is made in step S1 and the program proceeds to step S4. In step S4, signals output from the body angle sensor 16 and various sensors, e.g., the seating switch 17, etc. are obtained. Then, the program proceeds to step S5. In step S5, based on the signal from the seating switch 17, it is judged whether the drive state of the body 12 is a body-up state or a seated state and the program proceeds to step S6. Note that taking into consideration traveling vibration, etc. of the dump truck 1, the drive state of the body 12 is judged when the signal from the seating switch 17 keeps the same state, for example, for at least 1 second.

In step S6, the rotatable range is calculated and the program proceeds to step S7. Specifically, calculation of the denominator in equation (1) is performed. In step S7, it is judged whether or not the detection angle detected by the body angle sensor 16 is equal to or greater than the lower limit angle. Specifically, it is judged whether or not the sensor voltage value VP is equal to or greater than the lower limit value VL. When the detection angle detected based on the sensor output voltage signal of the body angle sensor 16 is equal to or greater than the lower limit angle, a positive judgment is made in step S7 and the program proceeds to step S8. In step S8, the rotation angle of the body 12 from the seated position is calculated and the program proceeds to step S9. Specifically, calculation of the numerator of the equation (1) is performed. In step S9, by using an angle of the rotatable range calculated in step S6 and the rotation angle of the body 12 calculated in step S8, the percentage of the inclination angle of the body 12 is calculated according to the equation (1) and the program proceeds to step S11.

When the detection angle detected based on the sensor voltage value of the body angle sensor 16 is below the lower limit angle, a negative judgment is made in step S7 and the program proceeds to step S10. In step S10, the percentage of the inclination angle of the body 12 is set to 0 percent and the program proceeds to step S11. In step S11, the inclination angle percentage Bangle (%) is converted into the meter screen-indicated value BHangle (%) and the program proceeds to step S12. In step S12, it is judged whether or not the meter screen-indicated value exceeds the upper limit value of the numerical value 44. When the meter screen-indicated value exceeds the upper limit value of the numerical value 44, a positive judgment is made in step S12 and the program proceeds to step S13. In step S13, the meter screen-indicated value is set to the upper limit value of the numerical value 44, and the program proceeds to step S14.

When the meter screen-indicated value does not exceed the upper limit value of the numerical value 44, a negative judgment is made in step S12 and the program proceeds to step S14. In step S14, it is judged whether or not the body 12 is in a seated state. When the body 12 is in a seated state, a positive judgment is made in step S14 and the program proceeds to step S15. In step S15, the meter screen-indicated value is fixed to 0 and the program proceeds to step S16. When the body 12 is not in a seated state, a negative judgment is made in step S14 and the program proceeds to step S16. In step S16, the meter screen-indicated value BHangle (%) and other information are transmitted to the IDU 26 via the CAN communication and the processing is terminated.

Then, referring to FIG. 11, the processing executed by the IDU 26 is explained. In step S20, the meter screen-indicated value BHangle (%) and other information are received from the HCU 22 via CAN communication and the program proceeds to step S21. In step S21, it is judged whether or not the seating switch 17 outputs an ON signal based on the received information. When the seating switch 17 outputs an ON signal, a positive judgment is made in step S21 and the program proceeds to step S22. In step S22, the body-up icon 36A is turned off and the processing is terminated. That is, the IDU 26 prohibits display of the inclination angle on the meter screen 3 when the body-up icon 36A is turned off. When the seating switch 17 outputs no ON signal, a negative judgment is made in step S21 and the program proceeds to step S23. In step S23, the body-up icon 36A is lighted and the program proceeds to step S24.

In step S24, it is judged whether or not the meter screen-indicated value is an abnormal value. When the meter screen-indicated value is an abnormal value, that is, when it is judged that the body angle sensor 16 is abnormal in step S1 of FIG. 10, a positive judgment is made in step S24 and the program proceeds to step S32. When the meter screen-indicated value is a normal value, a negative judgment is made in step S24 and the program proceeds to step S25.

In step S25, the background of a range, in which the gauge 43 of the body angle meter 38 increases and decreases, is displayed, for example, in white and the program proceeds to step S26. In step S26, the abnormality display icon 45 is turned on in a normal lighting mode (for example, in white) which indicates that the body angle sensor 16 is normal, and the program proceeds to step S27. In step S27, it is judged whether or not the meter screen-indicated value received via the CAN communication exceeds the maximal value of the indication width that can be displayed as the gauge 43 on the body angle meter 38. When it is judged that the meter screen-indicated value exceeds the maximal value of the indication width of the gauge 43, a positive judgment is made in step S27 and the program proceeds to step S28. In step S28, the indication width of the gauge 43 is set to the maximal value and the program proceeds to step S30.

When it is judged that the meter screen-indicated value is below the maximal value of the gauge 43 that can be displayed, a negative judgment is made in step S27 and the program proceeds to step S29. In step S29, the indication width of the gauge 43 is set according to the received screen-indicated value and the program proceeds to step S30. In step S30, the gauge 43 is displayed with the set indication width and the program proceeds to step S31. In step S31, the received meter screen-indicated value is displayed as the numerical value 44 and the processing is terminated.

In step S32 to which the program has proceeded as a result of the positive judgment made in step S24, the background of the range in which the gauge 43 of the body angle meter 38 increases and decreases is displayed, for example, in grey and the program proceeds to step S33. In step S33, the abnormality icon 45 is turned on in an abnormal lighting mode indicating that the body angle sensor 16 is abnormal and the program proceeds to step S34. In step S34, the gauge 43 is rendered non-displayed and in step S35, "--" is displayed as the numerical value 44 and then the processing is terminated.

According to the embodiment explained above, the following advantageous effects can be obtained.

(1) The body hoisting state display device 2 is provided in the dump truck 1 that includes the body 12 mounted on the frame 11, the hoist cylinder 15 that moves the body 12 up and down with respect to the frame 11 between standing and seating, the hoist lever 21 that operates up and down movement of the body 12, and the HCU 22 that controls the up and down movement of the body 12 by supplying or discharging pressure oil to or from the hoist cylinder 15 according to the amount of operation of the hoist lever 21 to extend or retract the hoist cylinder 15. The body angle sensor 16 of the body hoisting state display device 2 detects the rotation angle of the body 12 with respect to the frame 11. The HCU 22 judges whether or not the body 12 is seated on the frame 11. The HCU 22, based on the rotation angle detected by the body angle sensor 16, causes an inclination angle of the body 12 inclined from the state in which the body 12 is seated in the frame 11 to be calculated as a ratio to an angle of a shockless stop rotatable range that is defined between the seated state and a state in which the hoist cylinder 15 is stopped at a body-up-shockless position, which is short of a position at which the hoist cylinder 15 is extended to a maximal extent. The IDU 26, when the body 12 is seated in the frame 11, causes the ratio of the inclination angle of the body 12 calculated by the HCU 22 to be displayed as 0 percent, while when the body 12 is at the body-up-shockless position, causes the ratio of the inclination angle of the body 12 calculated by the HCU 22 to be displayed as 100 percent; the display may be performed directly and indirectly. That is, a configuration is adopted such that the inclination angle of the body 12 is displayed by using the gauge 43 and the numerical value 44. Therefore, the operator can readily recognize the inclination angle of the body 12. As a result, the operator can control the operating speed of the hoist cylinder 15 without difficulty.

(2) A configuration is adopted such that the IDU 26 causes the body angle at the body-up-shockless position, which is a position short of a position at which the hoist cylinder 15 is extended to a maximal extent, to be displayed as 100 percent on the meter screen 3, and when the hoist cylinder 15 is extended beyond that position, the IDU 26 causes the ratio of the inclination angle of the body 12 that is calculated by the HCU 22 to be displayed beyond 100 percent on the meter screen 3. Therefore, the possibility that the operator will perform operation to incline the body 12 beyond the body-up-shockless position can be decreased. As a result the durability of the hoist cylinder 15 increases.

(3) The IDU 26, when it is judged by the HCU 22 that the body 12 is non-seated in the frame 11, causes the body-up icon 36A to be displayed as lighted. On the other hand, when it is judged by the HCU 22 that the body 12 is seated in the frame 11, the IDU 26 causes the body-up icon 36A to be turned off. The IDU 26, based on the rotational angle detected by the body angle sensor 16, displays the information relating to the inclination angle of the body 12 with respect to the frame 11 on the meter screen 3 indirectly and directly by using the gauge 43 and the numerical value 44. On this occasion, the IDU 26, when the body-up icon 36A is off, prohibits display of information relating to the inclination angle of the body 12 and when the body-up icon 36A is displayed lighting, the IDU 26 causes the information relating to the inclination angle of the body 12 to be displayed.

When the body-up icon 36A is off, if the angle ratio display is performed based on the signal from the angle sensor 16, the operator will feel a sense of discomfort or strangeness. However, as in the present invention, the operator will not feel a sense of discomfort or strangeness by adopting the following configuration. That is, when the seating switch 17 is ON, the body-up icon 36A is caused to be turned off and only when the seating switch 17 is not ON, the body-up icon 36A is displayed lighting and display of the angle ratio by the gauge 43 is performed.

As will be understood from the embodiment mentioned above, the body hoisting state display device 2 according to the present invention executes processing involving the following steps.

The dump truck moves the body 12 up and down between a seating position and a standing position due to extension and retraction operation of the hoist cylinder 15 and during the up-and-down movement, interrupts the up-and-down movement operation of the body 12 at a body-up-shockless position, which is short of the standing position. In a method of displaying a body hoisting state of such a dump truck, the rotation angle of the body 12 is detected and it is judged whether or not the body 12 is seated. When it is judged that the body 12 is not seated, the body-up icon 36A, which indicates that the body 12 is during the up-and-down movement, is displayed on the display screen 3. When it is judged that the body 12 is seated, the display of the body-up icon 36A on the display screen 3 is turned off. Based on an output from the angle sensor 16, a rotation angle at which the body 12 is tilted from the seated position is calculated. The angle of the rotatable range between the seating position and the body-up shockless position is divided by the rotation angle. Only when it is judged that the body 12 is not seated, the result of the division is displayed on the display screen.

The body hoisting state display device according to the embodiment explained above may be varied as follows.

Figure 12:
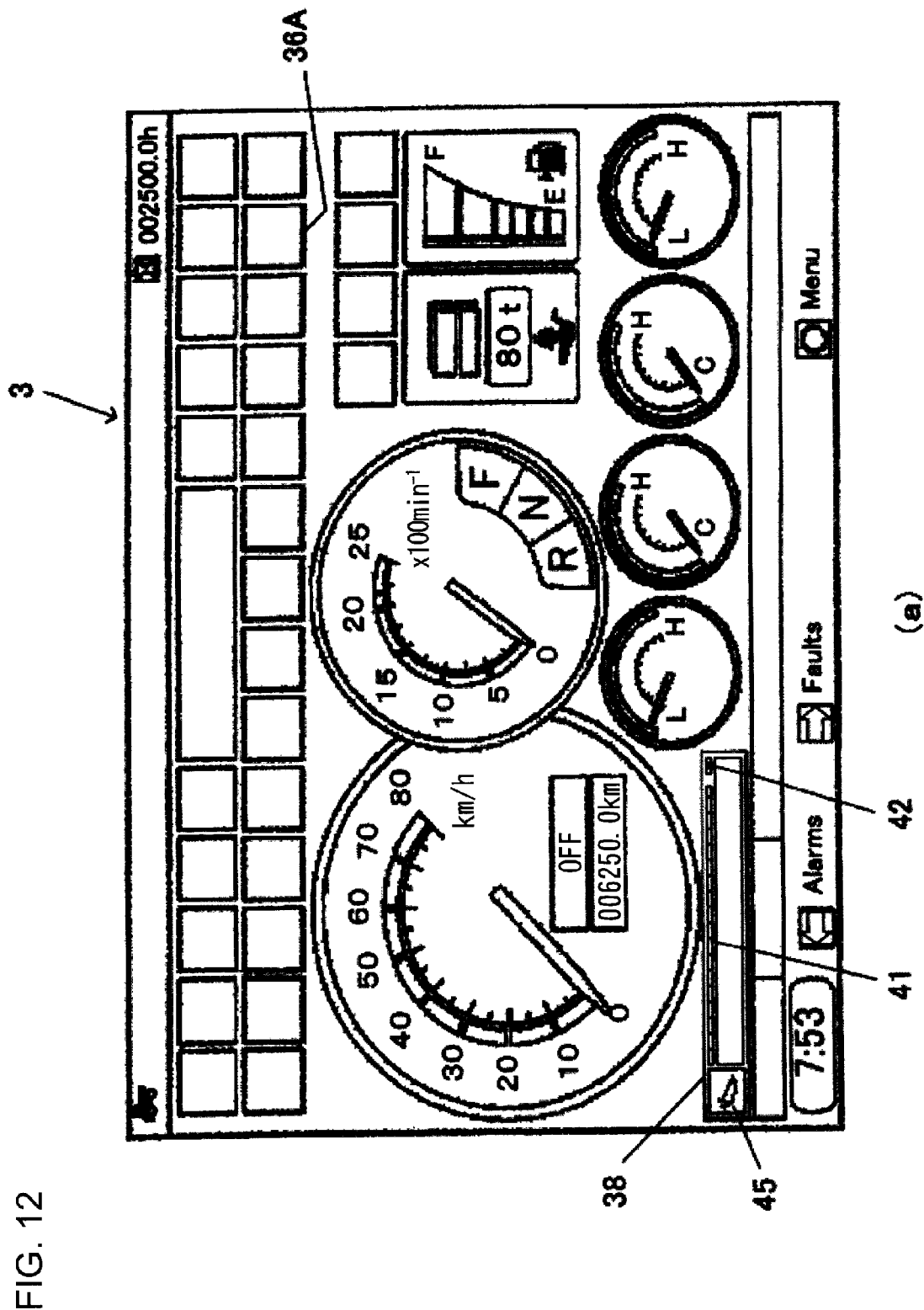
FIGS. 12a and 12b present diagrams explaining transition of the meter screen according to a variation example.
Figure 12:
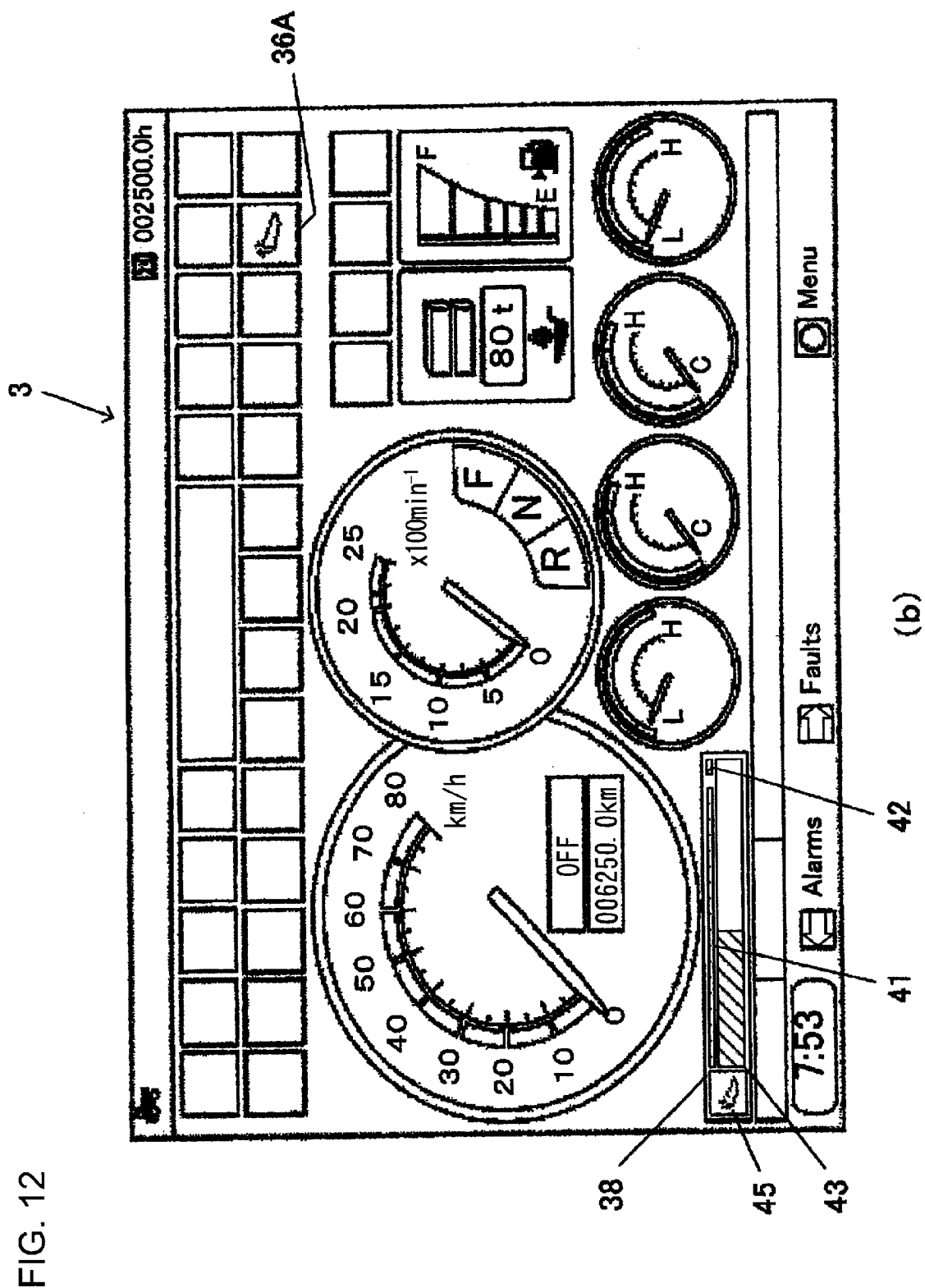
Figure 13:
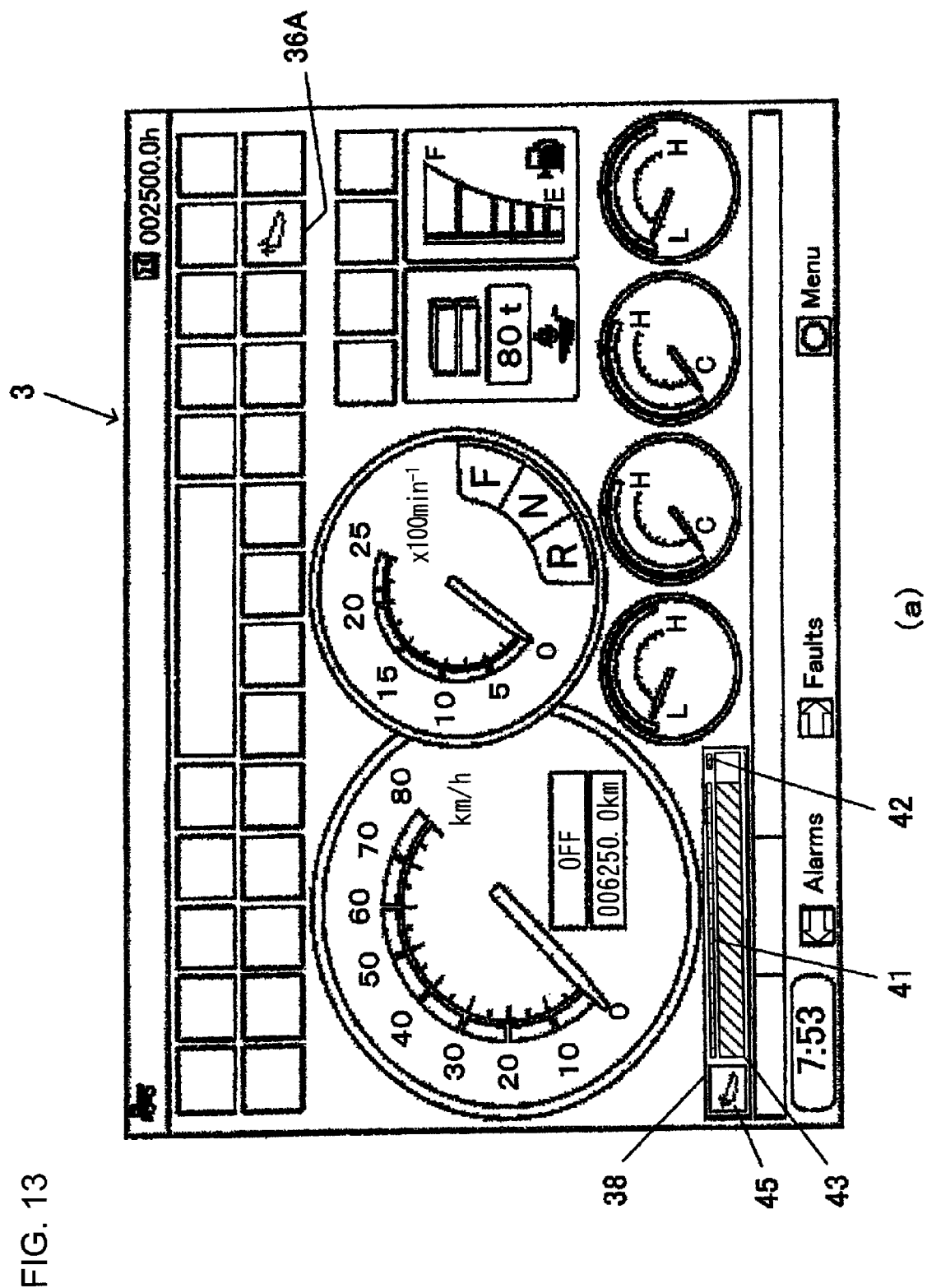
FIGS. 13a and 13b present diagrams explaining transition of the meter screen according to a variation example.
Figure 13:
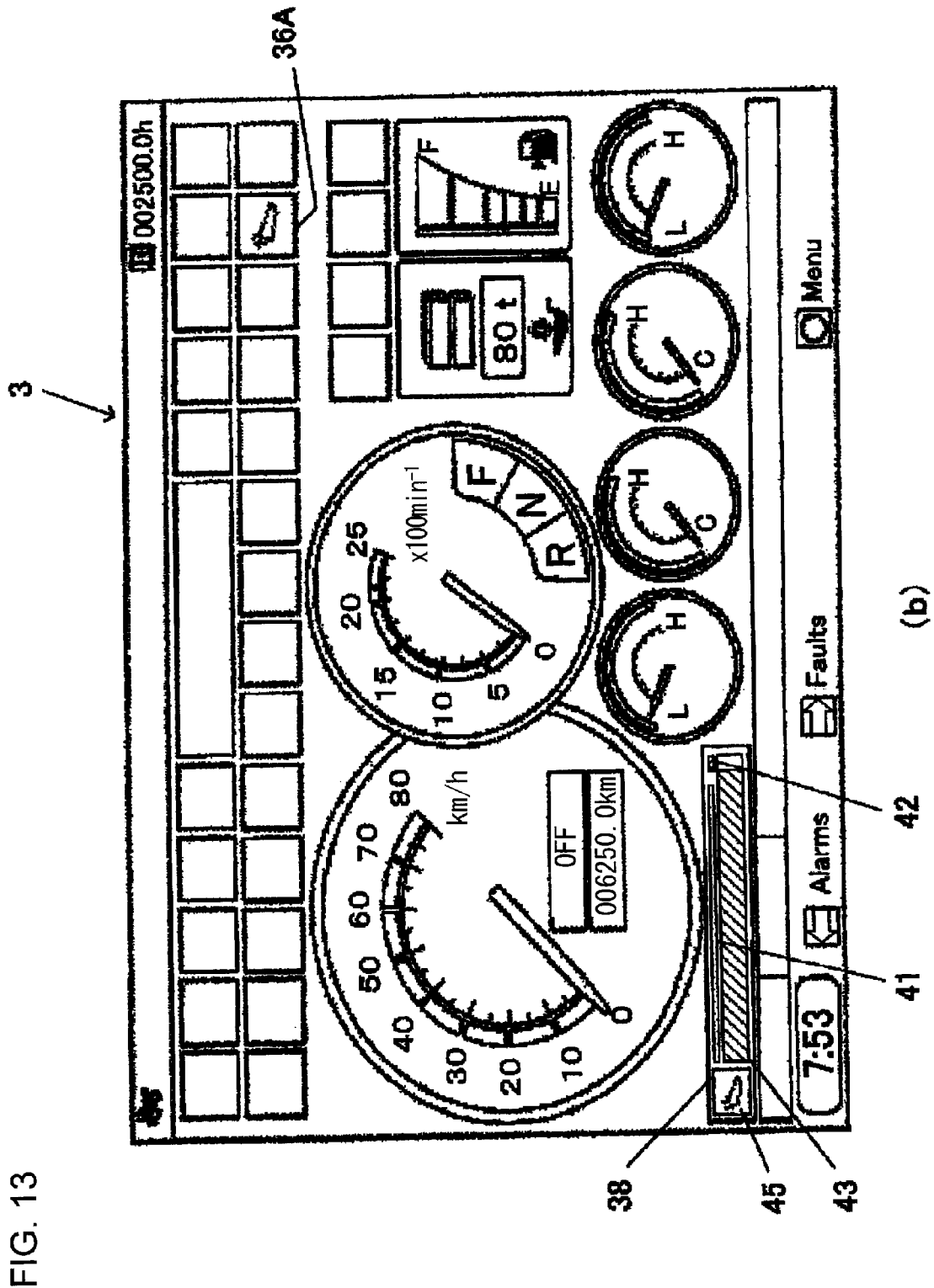
Figure 14:
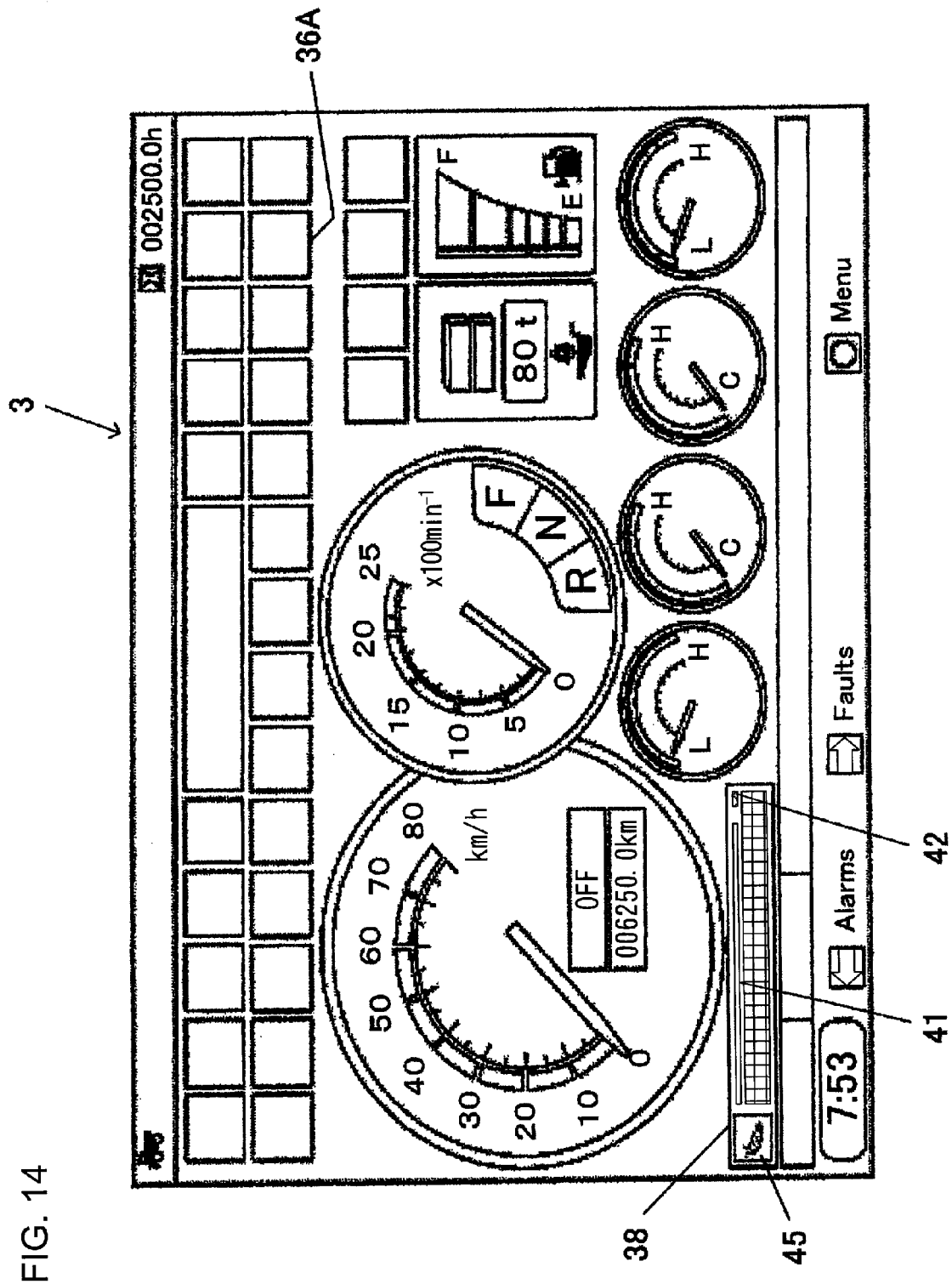
FIG. 14 presents a diagram explaining transition of the meter screen according to a variation example.

(1) The device may be configured such that instead of displaying the inclination angle of the body 12 by using the gauge 43 and the numerical value 44, the inclination angle may be indirectly displayed by using only the gauge 43. FIGS. 12 to 14 show an example of the transition of the meter screen 3 in this case. As shown in FIGS. 12 to 14, the gauge 43 is displayed at the body angle meter 38 on the meter screen 3 with its indication width being varied according to a change in the inclination angle of the body 12. FIGS. 12 to 14 correspond to FIGS. 7 to 9 with respect to the transition of the meter screen 3. Furthermore, the inclination angle of the body 12 may be displayed directly by using only the numerical value 44.

Figure 15:
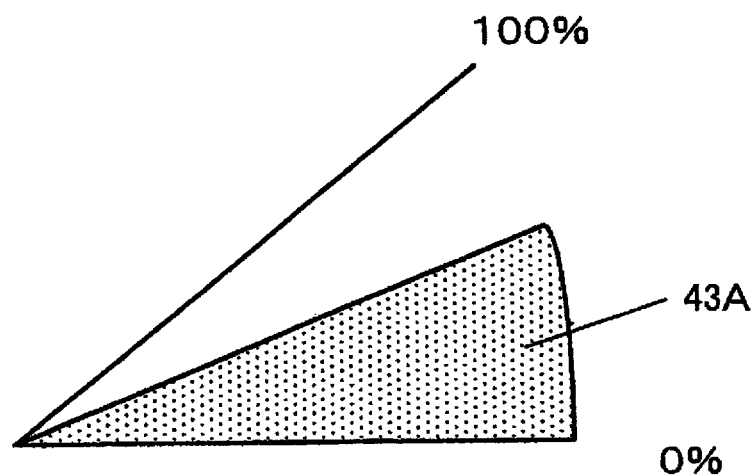
FIGS. 15a and 15b present diagrams showing an example of display of the inclination angle of the body according to a variation example.
Figure 15:
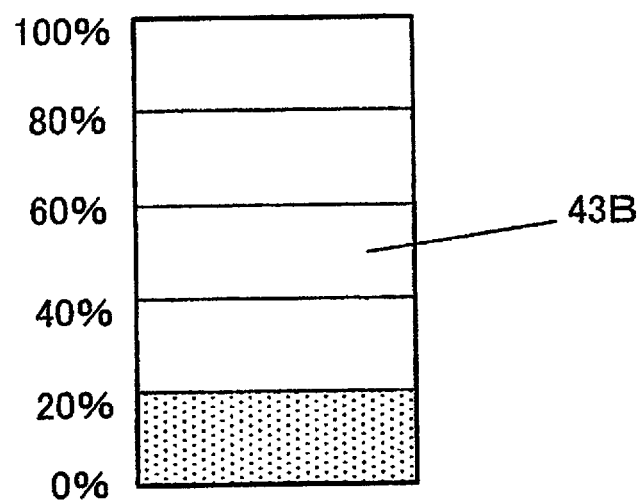

(2) When the inclination angle of the body 12 is displayed indirectly, the device is not limited to one that uses the gauge 43. For example, as shown in FIG. 15(a), the inclination angle of the body 12 may be displayed by using a circular graph 43A. In the example shown in FIG. 15(a), a dotted region of the circular graph 43A increases from a position of 0 percent to a position of 100 percent as the inclination angle of the body 12 increases. Alternatively, as shown in FIG. 15(b), the inclination angle of the body 12 may be displayed by using a level gauge 43B that displays it in respective predetermined stages within the rotatable range. In the example shown in FIG. 15(b), the rotatable range is staged by 20 percent. When the inclination angle of the body 12 increases to at least 20 percent (that is, the inclination angle is equal to or above 20 percent and below 40 percent), the dotted region of 0 to 20 percent may be, for example, lighted.

The present invention may also be applied to a case in which the inclination angle of the body 12 is not displayed in percentage but is displayed only directly in an angle at which the body 12 is rotated or tilted up from the seated position, that is, a numerical value obtained by converting the sensor voltage value (VP−VL) of the angle sensor 16 into angle, or a case in which the inclination angle of the body 12 is displayed only indirectly in the form of a bar.

The body hoisting state display device explained above may be configured as follows. That is, a body state display device in a dump truck configured to move the body 12 up and down between a seating position and a standing position by extension and retraction operations of the hoist cylinder 15, and interrupt the up-and-down operations of the body 12 during the up-and-down operations at a body-up-shockless position, which is a position short of the standing position, includes: the angle sensor 16 that detects a rotation angle of the body 12; a judgment unit (HCU 22) that judges whether or not the body 12 is seated; an icon display control unit that causes the body-up icon 36A, which indicates that the body 12 is during up and down movement, to be displayed on a display screen when it is judged by the judgment unit that the body 12 is not seated, or that causes the display of the body-up icon 36A on the display screen to be turned off when it is judged by the judgment unit that the body 12 is seated; and an angle display control unit that causes a rotation angle at which the body 12 is rotated from the seating position to be calculated based on an output of the angle sensor 16, causes the rotation angle to be divided by the angle of the rotatable range between the seating position and the body-up-shockless position, and causes the result of the division to be displayed on the display screen 38 only when it is judged that the body 12 is not seated.

As far as the features of the present invention are not damaged, the present invention is not limited to the embodiments described above and other embodiments conceivable within the technical concept of the present invention are included in the scope of the present invention. The embodiments and variation examples explained above may be combined with each other as appropriate.

The disclosure of the following priority application is herein incorporated by reference: Japanese Patent Application No. 2012-036253 (filed on Feb. 22, 2012).

The invention claimed is:

1. A body hoisting state display device to be mounted on a dump truck comprising:
   a body mounted on a frame;
   a hydraulic cylinder that moves up and down the body with respect to the frame between a seating position and a standing position;
   an operating member that operates up-and-down movement of the body;
   a hydraulic control controller that controls the up-and-down movement of the body by supplying or discharging pressure oil to or from the hydraulic cylinder, respectively, to extend or retract the hydraulic cylinder, respectively, according to an operation amount of the operating member; and
   the hydraulic control controller causes an extension and retraction operation of the hydraulic cylinder to be stopped at a shockless stop position short of the standing position at which the hydraulic cylinder is extended to a maximal extent,
   wherein the dump truck body hoisting state display device further comprises:
      a body angle sensor that detects a rotation angle of the body with respect to the frame;
      a seating switch that detects whether or not the body is seated on the frame;
         wherein the hydraulic control controller causes an inclination angle of the body at which the body is rotated with respect to the frame from a seated state of the body to be calculated, based on a rotation angle detected by the body angle sensor, as a ratio to an angle of a rotatable range that is defined between the seated state and a shockless stop state in which the hydraulic cylinder is stopped at the shockless stop position short of the standing position at which the hydraulic cylinder is extended to the maximal extent; and
      a display control controller that causes a ratio of the inclination angle of the body that is calculated by the hydraulic control controller to be displayed on a display screen.

2. The dump truck body hoisting state display device according to claim 1, wherein:
   when the seating switch detects that the body is non-seated with respect to the frame, the display control controller causes the ratio of the inclination angle of the body and an icon, which indicates that the body is during the up-and-down movement, to be displayed on the display screen, and
   when the seating switch detects that the body is seated with respect to the frame, the display control controller causes the display of the ratio of the inclination angle of the body and the icon to be interrupted.

3. The dump truck body hoisting state display device according to claim 1, further comprising:
   the hydraulic control controller that causes the hydraulic cylinder to stop an extension operation thereof at the shockless stop position short of the standing position at which the hydraulic cylinder is extended to the maximal extent, wherein
   the display control controller causes the ratio of the inclination angle of the body calculated by the hydraulic control controller to be displayed numerically as 0 percent on the display screen when the seating switch detects that the body is seated with respect to the frame, and
   when the body is stopped at the shockless stop position short of the position at which the hydraulic cylinder is extended to the maximal extent, the display control controller causes the ratio of the inclination angle of the body calculated by the hydraulic control controller to be displayed numerically as 100 percent on the display screen, and when the body is at any angular position within the rotatable range, the display control controller causes the ratio of the inclination angle of the body to the angle at the shockless stop position short of the standing position at which the hydraulic cylinder is extended to the maximal extent to be displayed numerically on the display screen.

4. The dump truck body hoisting state display device according to claim 3, further comprising:
   a non-transitory storage medium that stores a seating angle based on a first signal value output from the body angle sensor when the body is seated and a shockless stop angle based on a second signal value output from the body angle sensor when the hydraulic cylinder stops extension and retraction operation thereof at the shockless stop position short of the standing position at which the hydraulic cylinder is extended to the maximal extent so that the body is stopped at a shockless stop position short of the standing position, wherein:
   the hydraulic control controller calculates a rotatable angle of the body based on a difference between the seating angle and the shockless stop angle, and a rotation angle of the body based on a difference between a third signal value output from the body angle sensor at any rotating position of the body and the first signal value, and divides the rotation angle of the body by the rotatable angle of the body, and the display control controller causes the inclination angle of the body to be displayed on the display screen in ratio based on a result of division by the hydraulic control controller.

5. The dump truck body hoisting state display device according to claim 1, wherein:
the display control controller causes the ratio of the inclination angle of the body to be displayed in a form of a bar graph on the display screen.

\* \* \* \* \*